(12) United States Patent
Vishwakarma

(10) Patent No.: US 12,381,792 B2
(45) Date of Patent: *Aug. 5, 2025

(54) SOFTWARE SERVICE PLATFORM

(71) Applicant: Avalara, Inc., Seattle, WA (US)

(72) Inventor: Ramashish Ramprakash Vishwakarma, Pune (IN)

(73) Assignee: Avalara, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,624

(22) Filed: Mar. 27, 2024

(65) Prior Publication Data
US 2024/0283715 A1 Aug. 22, 2024

Related U.S. Application Data

(63) Continuation of application No. 16/380,914, filed on Apr. 10, 2019, now Pat. No. 11,979,303.

(30) Foreign Application Priority Data

Apr. 10, 2019 (IN) .............................. 201941014453

(51) Int. Cl.
| | | |
|---|---|---|
| H04L 41/50 | (2022.01) | |
| G06F 9/54 | (2006.01) | |
| G06F 16/14 | (2019.01) | |
| H04L 41/5041 | (2022.01) | |

(52) U.S. Cl.
CPC .......... *H04L 41/5096* (2013.01); *G06F 9/547* (2013.01); *G06F 16/148* (2019.01); *H04L 41/5045* (2013.01)

(58) Field of Classification Search
CPC ............. H04L 41/5096; H04L 41/5045; G06F 16/148; G06F 9/547
See application file for complete search history.

(56) References Cited

U.S. PATENT DOCUMENTS

| | | |
|---|---|---|
| 7,783,536 B2 | 8/2010 | William et al. |
| 7,933,803 B1 | 4/2011 | Nadler et al. |
| 8,620,578 B1 | 12/2013 | Brown et al. |
| 8,725,407 B2 | 5/2014 | Hurley et al. |
| 8,938,061 B1 | 1/2015 | Dendy et al. |
| 9,037,735 B1* | 5/2015 | Fallows ................ H04L 67/141 709/228 |
| 9,075,687 B1 | 7/2015 | Liu et al. |
| 9,462,089 B1 | 10/2016 | Fallows |
| 9,760,915 B2 | 9/2017 | Pavlou et al. |
| 10,425,295 B1 | 9/2019 | Hazen et al. |
| 10,445,818 B1 | 10/2019 | Chowdhary |
| 10,469,330 B1 | 11/2019 | Roth et al. |
| 10,769,611 B2 | 9/2020 | McNeel |
| 2002/0138765 A1 | 9/2002 | Fishman et al. |
| 2004/0187096 A1* | 9/2004 | Dumont ................ G06F 9/4492 717/116 |
| 2004/0194053 A1* | 9/2004 | Bonsma .............. G06F 9/44505 717/100 |

(Continued)

*Primary Examiner* — William G Trost, IV
*Assistant Examiner* — Abdelbasst Talioua
(74) *Attorney, Agent, or Firm* — Jeremiah J. Baunach; Frontier IP Law PLLC

(57) ABSTRACT

Some embodiments of the present disclosure may relate generally to platforms for providing software services. Other embodiments may be disclosed and/or claimed.

17 Claims, 20 Drawing Sheets

(56) References Cited

U.S. PATENT DOCUMENTS

| | | | |
|---|---|---|---|
| 2005/0055279 A1* | 3/2005 | Baur | G06Q 40/02 |
| | | | 705/19 |
| 2006/0041665 A1* | 2/2006 | Karnik | H04L 67/51 |
| | | | 709/228 |
| 2007/0136158 A1 | 6/2007 | Rawlings et al. | |
| 2007/0136159 A1 | 6/2007 | Rawlings et al. | |
| 2009/0259683 A1* | 10/2009 | Murty | G06F 16/289 |
| 2010/0106772 A1 | 4/2010 | Gupta et al. | |
| 2012/0330699 A1* | 12/2012 | Allgaier | G06Q 10/00 |
| | | | 705/7.11 |
| 2013/0013471 A1 | 1/2013 | Fishman | |
| 2015/0011311 A1 | 1/2015 | Relan et al. | |
| 2015/0089476 A1 | 3/2015 | Dhoolia et al. | |
| 2015/0229521 A1 | 8/2015 | Mayer et al. | |
| 2015/0317147 A1 | 11/2015 | Nachimuthu et al. | |
| 2016/0048383 A1 | 2/2016 | Nachimuthu et al. | |
| 2016/0165004 A1 | 6/2016 | Tennie et al. | |
| 2016/0335067 A1 | 11/2016 | Narayanan | |
| 2017/0011135 A1* | 1/2017 | Srivastava | G06F 16/86 |
| 2017/0168783 A1* | 6/2017 | Liu | G06F 8/34 |
| 2018/0167437 A1* | 6/2018 | Kumar N | H04L 67/141 |
| 2019/0065553 A1 | 2/2019 | Young et al. | |
| 2019/0098071 A1* | 3/2019 | Bitincka | H04L 67/34 |

\* cited by examiner

FIGURE 7F

SOFTWARE SERVICE PLATFORM

CROSS REFERENCE TO RELATED APPLICATIONS

The present application is a continuation application to U.S. patent application Ser. No. 16/380,914 filed Apr. 10, 2019, which claims international priority under 35 U.S.C. § 119 to co-pending Indian Patent Application No. 201941014453, filed Apr. 10, 2019, entitled "SOFTWARE SERVICE PLATFORM", the entire content and disclosure of which is hereby incorporated by reference in its entirety.

BACKGROUND

Increasingly, many users utilize software services provided by a number of different software service platforms. For example, enterprise resource planning ("ERP") systems help businesses collect information relating to their operations, such as production, resource management, inventory management, sales, delivery, billing, and other operations. Similarly, accounting software applications help businesses with their accounting information, such as payroll, purchase orders, accounts payable, sales invoices, accounts receivable, and so on.

However, software service platforms often cannot provide all the customized services needed by users, particularly if the users are in different fields. For example, users from business entities in different industries may need for ERP, accounting software, security software, and other software services, but the specifics of providing such services for a particular user or entity may vary significantly. Embodiments of the present disclosure address these and other issues by providing software platforms that can be efficiently and intuitively accessed and customized to suit the needs of individual entities.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
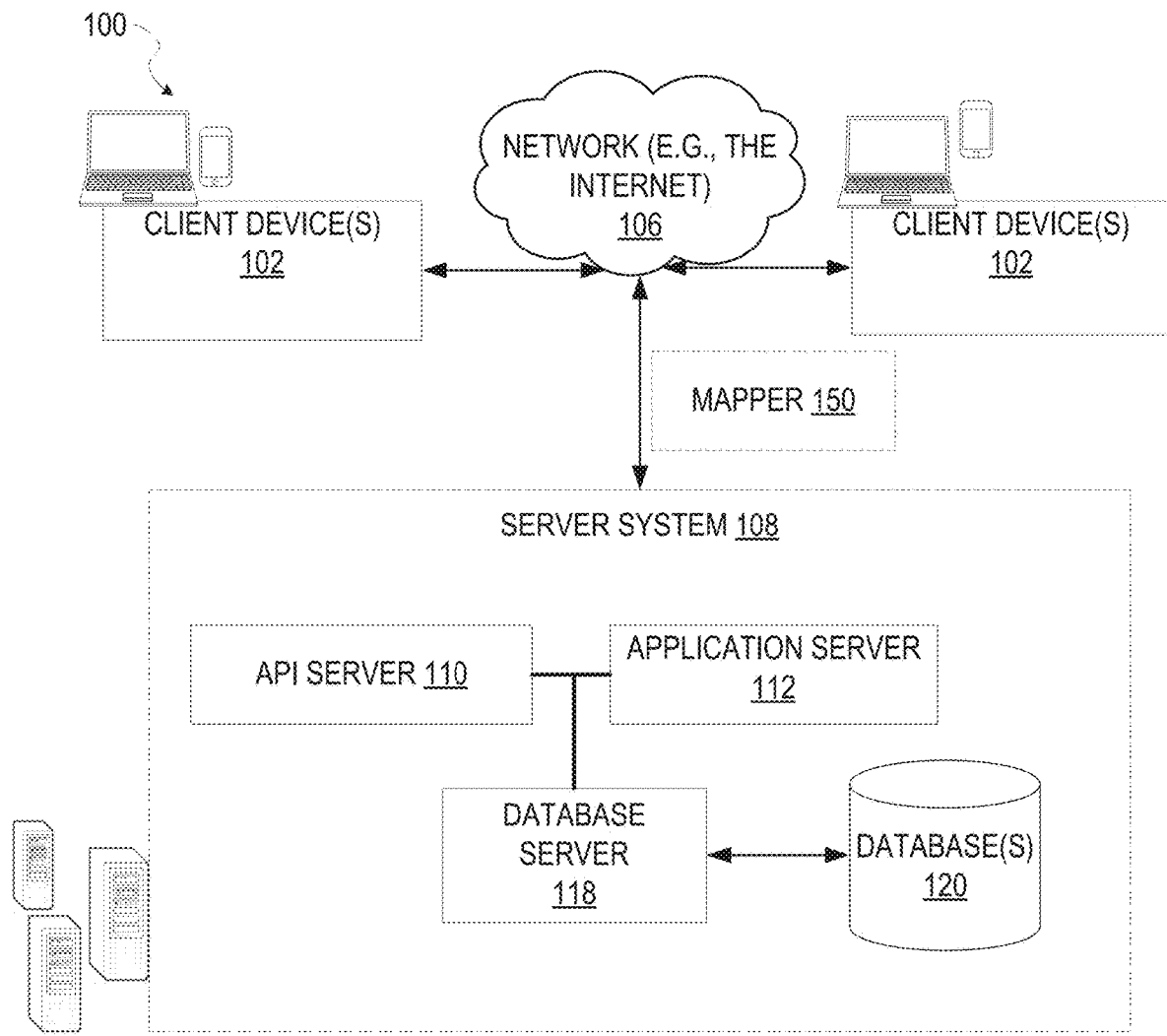
FIG. 1 is a block diagram showing an example of a system according to various embodiments of the present disclosure.

FIG. 1 is a block diagram showing an exemplary system 100 for exchanging data over a network. In this example, the system 100 includes multiple client devices 102, each of which that may host a number of applications. In this context, a "client device" may refer to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

Each client device 102 may communicate and exchange data with other client devices 102, as well as with server system 108 via the network 106. Such data may include functions (e.g., commands to invoke functions) as well as payload data (e.g., text, audio, video or other multimedia data). In this context, the network 106 may be, or include, one or more portions of a network such as an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The server system 108 provides server-side functionality via the network 106 to one or more client devices (102). While certain functions of the system 100 are described herein as being performed by either a client device 102 or by the server system 108, it will be appreciated that some functionality may be interchangeably performed by either the client device 102 or by the server system 108. For example, it may be technically preferable to initially deploy certain technology and functionality within the server system 108, but later migrate this technology and functionality to a client device 102 having sufficient processing/memory capacity. Additionally, some functionality of embodiments of the present disclosure may be distributed across a plurality of different processors and/or computing devices, including one or more client devices 102 and server systems 108.

The server system 108 supports various services and operations that are provided to the client devices 102. Such operations include transmitting data to, receiving data from, and processing data generated by the client device 102. This data may include, for example, message content, client device information, geolocation information, database information, transaction data, social network information, and other information. Data exchanges within the messaging system 100 are invoked and controlled through functions available via user interfaces (UIs) of the client devices 102.

In the example depicted in FIG. 1, system 108 includes an Application Program Interface (API) server 110 that is coupled to, and provides a programmatic interface to, an application server 112. The API server 110 and application server 112 are communicatively coupled to a database server 118, which facilitates access to a database 120 including data that may be processed by the application server 112. In other embodiments, the functionality of the API server 110, application server 112, and database server 118 may be performed by more or fewer systems. In some embodiments, for example, server system 108 may comprise a single server having API functionality, application functionality, and database functionality.

In the example shown in FIG. 1, the API server 110 receives and transmits data (e.g., commands and message payloads) between the client device 102 and the server system 108. Specifically, the API server 110 provides a set of interfaces (e.g., routines and protocols) that can be called or queried by the one or more software applications running on a client device 102 in order to invoke functionality of the application server 112 or database server 118. The API server 110 exposes various functions supported by the application server 112, including account registration, login functionality, the sending of messages, search queries, and other functionality.

The application server 112 hosts a number of applications and subsystems. For example, the application server 112 may implement a variety of message processing technologies and functions, including various data-processing operations, with respect to data received within the payload of a message received from one or more client devices 102, or retrieved from one or more databases 120 by database server 118.

In the example depicted in FIG. 1, system 100 may include a mapper functional component 150. The mapper 150 may include functionality described in more detail below, and may be implemented by server system 108 and/or client devices 102. In some embodiments, the mapper 150 may be implemented as part of an enterprise resource platform (ERP).

Software Service Platform

Figure 2:
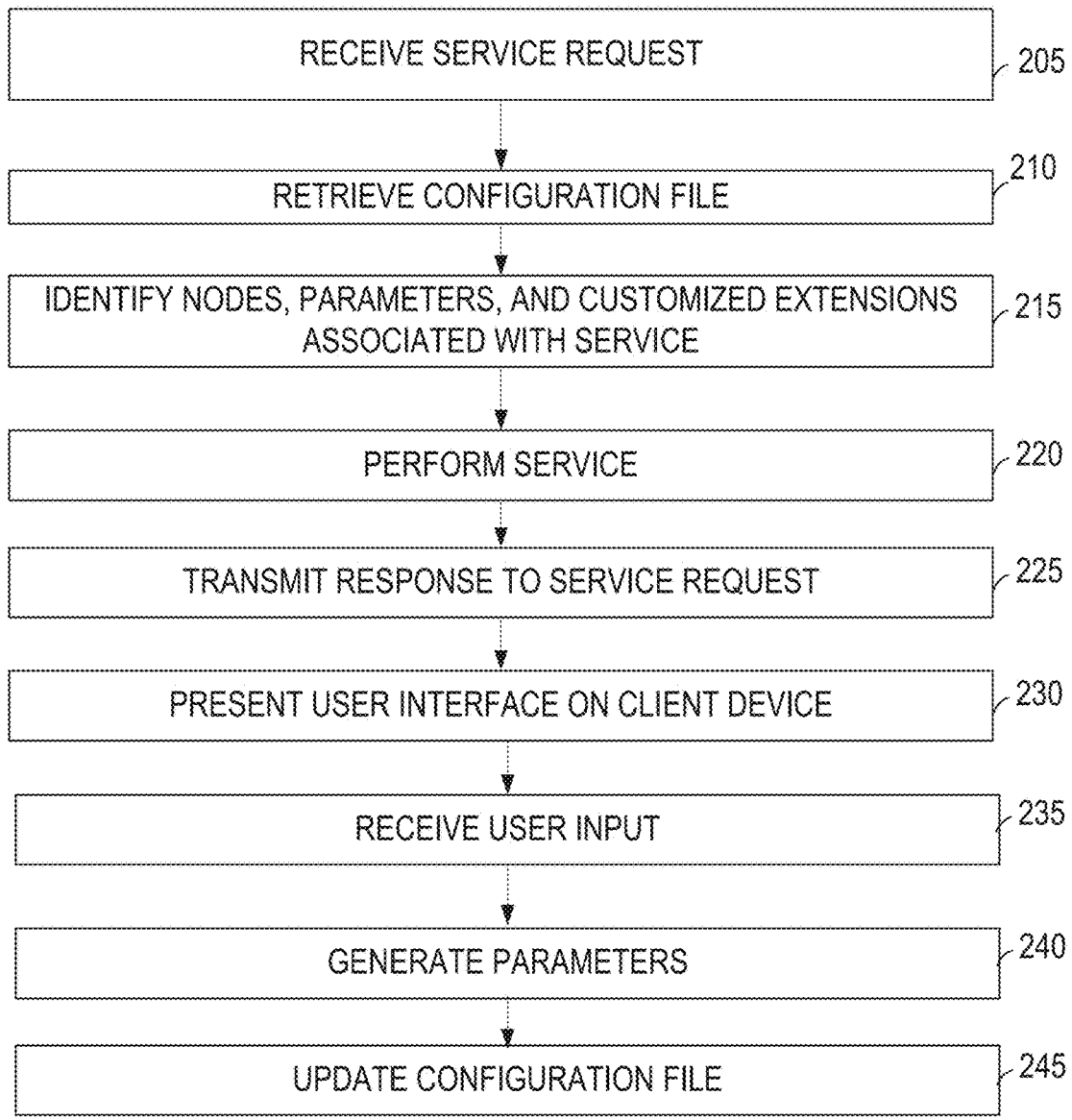
FIG. 2 is a flow diagram of an exemplary process according to various embodiments of the disclosure.

FIG. 2 depicts an exemplary process according to various aspects of the present disclosure. In this example, method 200 includes receiving a request to perform a service (205), retrieving a configuration file (210), identifying one or more nodes, parameters, and/or customized extensions associated with the service based on the configuration file (215), performing the service (220), and transmitting a response to the service request (225). Method 200 further includes presenting a user interface on display screen of a client device (230), receiving user input via the user interface (235), generating one or more parameters based on the user input (240), and updating the configuration file based on the user input (235). The steps of method 200 may be performed in whole or in part, in conjunction with each other as well as with some or all of the steps in other methods, and may be performed by any number of different systems, such as the systems described in FIGS. 1, 8, and 9.

In method 200, the system (such as server system 108 in FIG. 1) may receive a service request (205) from a client computing device (such as client device 102) over a network (e.g, network 106). In alternate embodiments, the system may receive the service request (205) using a variety of different communication methods and formats. In some embodiments, the service request may be made via an API (such as a Salesforce® Connector) to invoke one or more processes.

The system retrieves a configuration file (210) containing configuration information for performing the service. In some embodiments, the configuration file may be in a markup language format (such as extensible markup language (XML)). In some embodiments, the configuration information may be stored in a plurality of nodes, with each respective node in the plurality of nodes comprising a respective set of parameters associated with the service.

The system identifies the nodes, parameters, and customizations (such as customized extensions and fields) associated with the service from the configuration file (215). In some embodiments, the configuration file may include nodes in a flat or hierarchal structure. In one embodiment, for example, the configuration file may include a feature node identifying an application program interface (API) to be used in conjunction with performing the service. Some specific examples of feature nodes and other components of a configuration file in XML format may be found below in the "OPERATION EXAMPLES" section.

In some embodiments, the configuration file may include an object node identifying an object component used in performing the service. The object node may include a variety of information, and the object component may include other nodes. For example, the object component may include a query node that includes information for performing a query for an attribute of the object component (e.g., for information stored in database 120 in FIG. 1). The information for performing the query may include information in an object query language (OQL) (such as a Salesforce® OQL) for performing the query.

The object component may include any number of different nodes. In some embodiments, for example, the object component may further include a parameter node that includes parameters for performing the query for the attribute. The object component may further include a mapping node that includes parameters associated with the request to perform the service, as well as an update mapping node that includes parameters associated with the response to the request.

The system performs the service (220) based on the content of the configuration file. For example, the system may perform the service using a user-customized extension identified in the configuration file. In this manner, a user of the system may invoke customized hooks to perform functionality that would otherwise not be available from the APIs of conventional systems.

The system may perform a variety of functions based on the configuration file. In one embodiment, the configuration file comprises an identifier for an object and validation parameters for the object. In this example, in conjunction with performing the service (220), the system validates the object based on the validation parameters. A specific example of validating an object based on validation parameters may be found below in the "OPERATION EXAMPLES" section with reference to address verification.

Embodiments of the present disclosure may be utilized to validate a variety of objects based on a variety of different validation parameters. For example, the object may be or include an account, and the validation parameters may include an account identifier and other information (e.g., address information) associated with the account.

The validation parameters may include a variety of information, including nodes. Continuing the example of validating an account, the validation parameters may include a mapping node that includes parameters associated with a request to validate the account (e.g., received in a service request (205)).

Similarly, the validation parameters may include an update mapping node that includes parameters associated with a response to the request to validate the account. The update mapping node parameters may be used to format the response to the service request (225).

The system transmits a response to the request to perform the service (225). For example, the system may transmit the response to the client computing device from which the service request was received (205). The response may include data, status information, and other results from performing the service (220).

The system may present a user interface on the client device (230) (e.g., one or more windows displayed on the display screen of the client device) to display or retrieve information for performing the service. In some embodiments, for example, the system may present a user interface on the display screen of a computing device and receive (via the user interface) user input (235) that includes OQL for performing a query. The system may then update the configuration file (245) by storing the OQL for performing the query within a query node in the configuration file. Similarly, the system may receive user input (235) that includes parameters for performing the query, and update the configuration file (245) to store the parameters for performing the query within the parameter node in the configuration file.

In another example, the system may receive user input (235) via the user interface that includes an identifier for customized extension, and update the configuration file (245) by storing the customized extension identifier in the configuration file. Similarly, the system may present a user interface (230) on a display screen of the client computing device that includes an identifier for a hook associated with the service. The system may receive user input (235) via the user interface that includes a definition for the customized extension, and update the configuration file (245) by storing the definition for the customized extension in the configuration file. In this manner, a user may create custom processes and identify them via the configuration file to be executed during performance of the service. For example, the system may perform the service by executing a first process associated with the service, and executing a second process associated with the customized extension. Any number of such built-in and customized processes may be executed in conjunction with the performance of a service by embodiments of the present disclosure.

The system may present a variety of user interface screens (230) to receive content for updating the configuration file (245). Specific examples of user interface screens that may be used in conjunction with embodiments of the present disclosure are depicted in FIGS. 7D-7S and described below in the "OPERATION EXAMPLES" section with reference to the Tax Mapper example and the Mapper Studio.

The system may also generate content for the configuration based on input received from the user. For example, the system may receiving user input via the user interface that includes an identifier for the object, and generate parameters (240) for the object (e.g., validation parameters as described above) based on the object identifier. The system may update the configuration file (245) by storing the object identifier and the validation parameters for the object in the configuration file.

Figure 3:
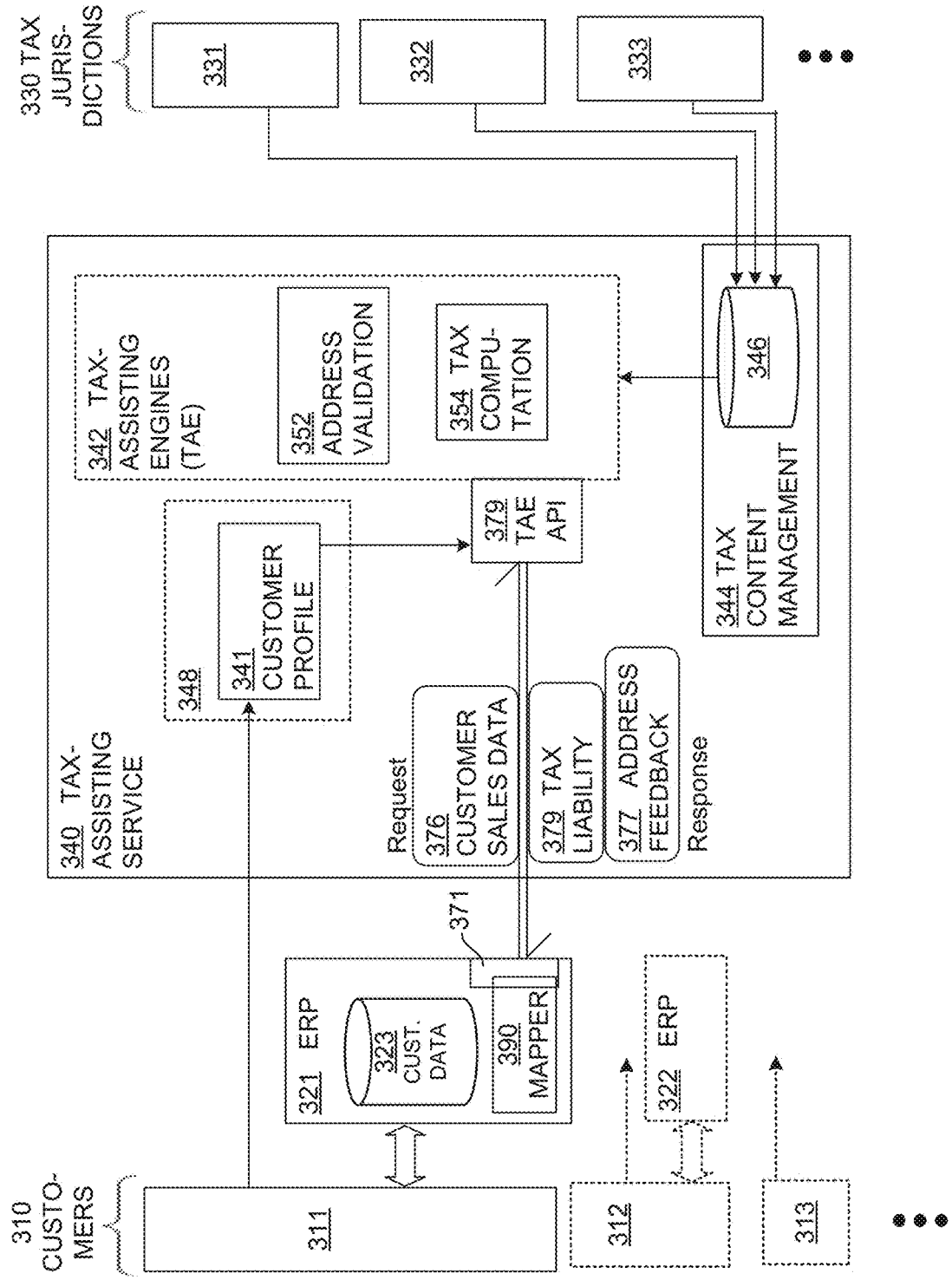
FIG. 3 depicts an exemplary functional block diagram according to various embodiments of the present disclosure.

FIG. 3 is a functional block diagram of a software architecture illustrating the operation of a mapper in conjunction with other components according to various embodiments of the present disclosure. In this example, the system performs tax calculations and other tax-related services (e.g., as described in more detail below in the "OPERATION EXAMPLES" section. The functionality of the system in FIG. 3 may be performed by any number of different systems, such as the systems described in FIGS. 1, 8, and 9.

In this example, customers 310 (e.g., customers 311, 312, 313, . . . ) interface with ERP systems 321, 322 (e.g., via respective client computing devices associated with each respective customer). Database 123 stores customer data associated with customers 310. Tax information is received from one or more tax jurisdictions 130 (e.g. 131, 132, 133, . . . ).

Component 390 represents an embodiment of a mapper according to various aspects of the present disclosure (e.g., a tax mapper as described below). The mapper 390 may communicate with an online tax-assisting service platform 340 via connector 371 to API 379.

The tax-assisting service 340 includes a tax content management component 344 with a database 346 to store tax rules, rates, exemptions, etc. The tax-assisting service platform 340 may be invoked via API 379, for example when it receives a request with data 376 on behalf of customer 311 from EPR 321. Data 376 may be looked up from customer data in database 323.

In this example, tax-assisting service 340 includes an address validation engine 352 and a tax computation engine 354. Upon being invoked, address validation engine 352 performs an address-validation process based on the customer data 376 and responds with address feedback response 377 (e.g., a validated address or an indication an address is invalid). The tax computation engine 365 responds to an invocation by calculating tax liability 379, the amount of tax due.

In some embodiments, the tax-assisting service platform 340 may perform a variety of services related, or in addition to, the address validation and tax-computation services described above. For example, the tax-assisting service platform 340 may accumulate and store sales data 376. In another example, another engine or functional component (not shown), upon being invoked, can register one or more of customers 310 with one or more appropriate tax jurisdictions 330. In yet another example, another engine or functional component (not shown), upon being invoked, can generate tax returns (e.g., filled forms) for customers 310 and/or file such returns with the appropriate tax jurisdiction(s) 330.

Figure 4A:
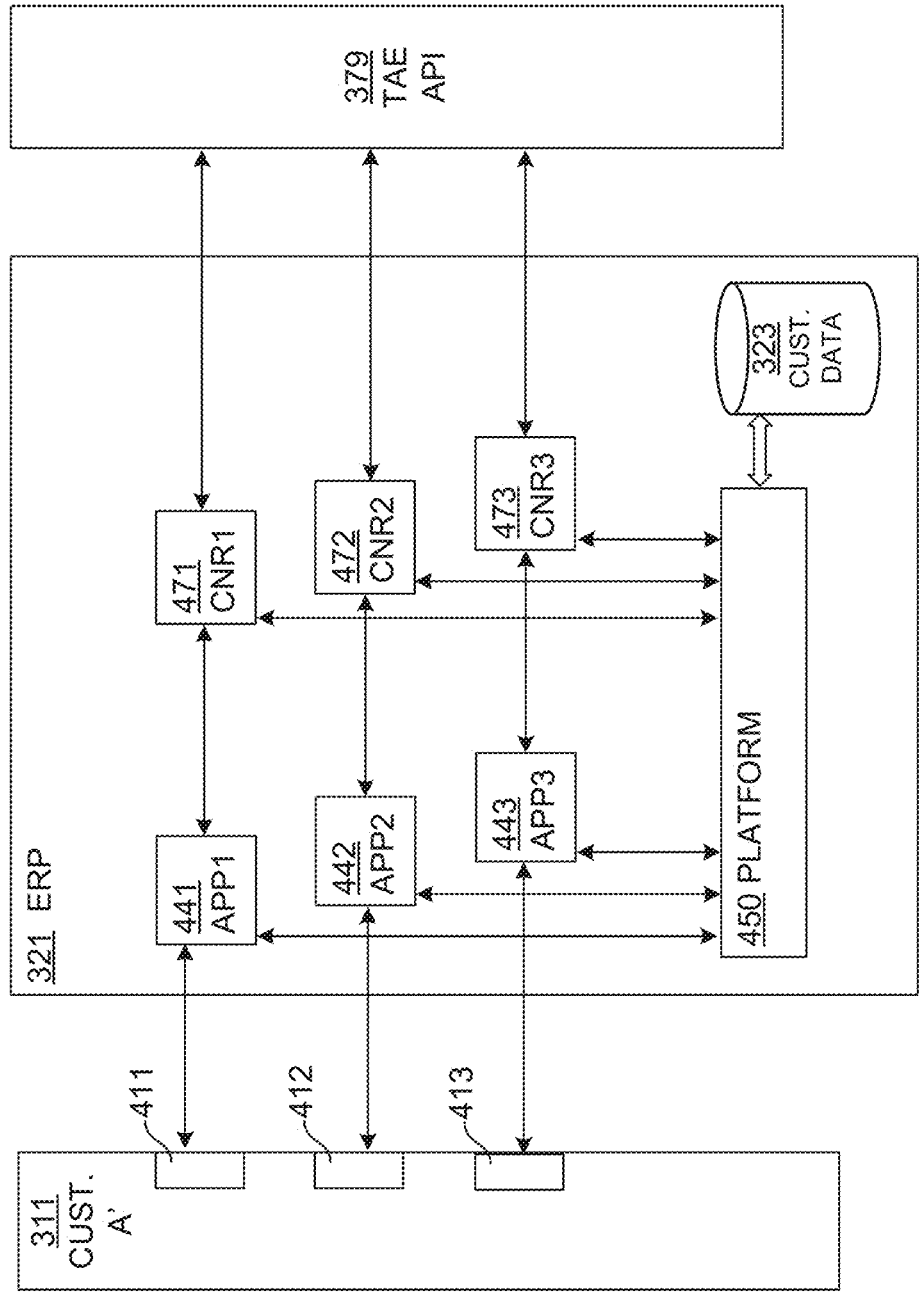
FIGS. 4A and 4B depict exemplary functional block diagrams of conventional systems.

FIG. 4A illustrates a functional block diagram of a conventional ERP system 321. In this example, ERP system 321 includes applications 241, 242, 243 to provide the services of the ERP. In one particular example, ERP 321 may be hosted by a Salesforce® host and include a billing application 441 ("Billing"), a Configure Price Quote (CPQ) application 442, and a web services application 443 ("salesforce.com").

In this example, customer 311 has connectors 411, 412, 413 that can invoke applications 441, 442, 443, respectively. Each of 441, 442, 443 communicates with platform 450 which, in turn, communicates with database 323 storing customer data. If access to the tax-assisting service platform 340 has been enabled, applications 441, 442, 443 can actuate their respective connector 471, 472, 473 to operate as connector 371 in FIG. 3. In some embodiments, connectors 471, 472, 473 can also activate platform 450, and get a response.

Figure 4B:
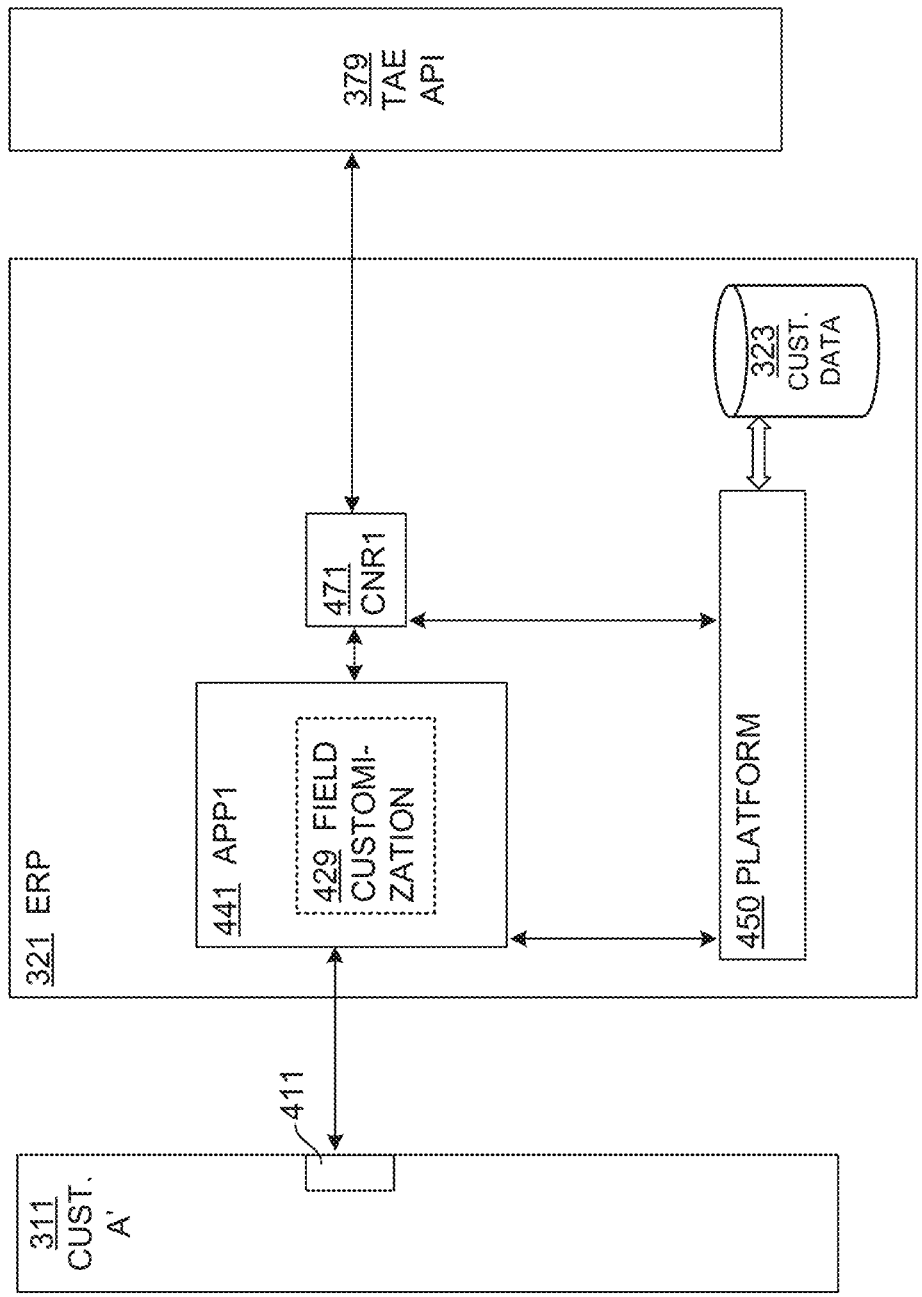

FIG. 4B illustrates a functional block diagram providing additional detail for the ERP system 321 shown in FIG. 4A. In this example (for case of illustration), only one application 441 is shown, with its connector 471 and application 441. In this example, the ERP 121 permits field customization 429. However, such customization presents a problem for connector 471, because it is unable to properly call API 379 with the added customization. As such, customer 311 may be unable to fully customize the functionality of ERP 321 to suit customer 311's needs.

Figure 5:
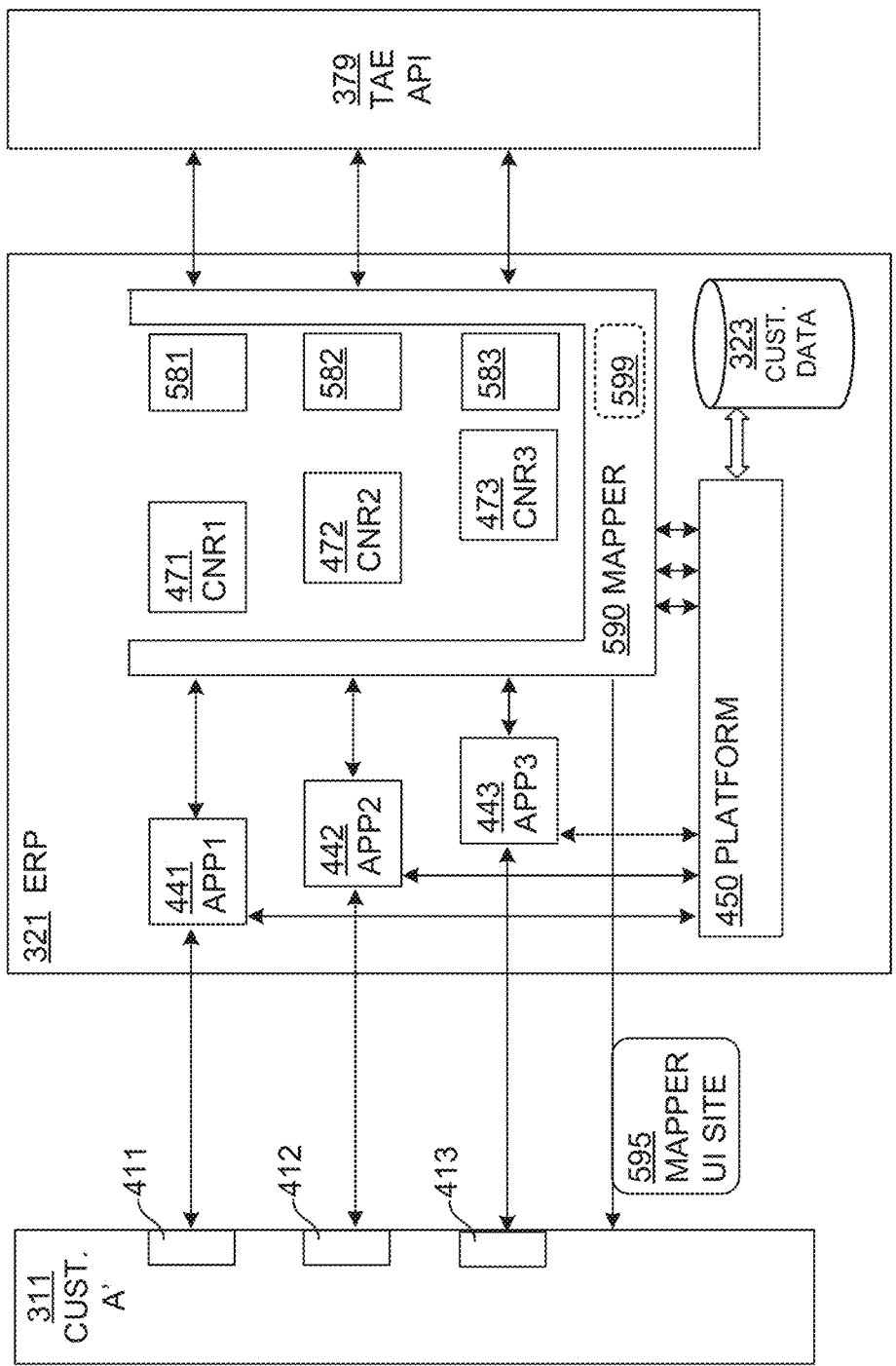
FIGS. 5 and 6 depict exemplary functional block diagrams of systems according to various embodiments of the present disclosure.

FIG. 5 illustrates a functional block diagram of an ERP 321 that includes a mapper component 590 to address the service-customization issues with the conventional ERP systems shown in FIGS. 4A and 4B. In the example depicted in FIG. 5, mapper 390 envelops connectors 471, 472, 473.

Additionally, configuration files 381, 382, 383 are generated for respective connectors 271, 272, 273. These configuration files 381, 382, 383 are also enveloped by mapper 390 in this example. In some embodiments, the configuration files may comprise a markup language format that is both machine-readable and human-readable. For example, as described in other examples herein, the configuration files 381, 382, 383 may be extensible markup language (XML) files.

In this example, mapper 390 interfaces with applications 441, 442, 443. Mapper also interfaces with platform 350 and API 379. In this example, a mapper UI suite 595 may be used to present user interface screens (e.g., such as the UI screens depicted in FIGS. 7D-7S described below) to display and collect information from customers 311 to generate or modify configuration files 381, 382, 383. As described herein, mapper 590 may utilize configuration files 381, 382, 383 in conjunction with customer data 599 to perform custom processes related to applications 441, 442, 443.

Figure 6:
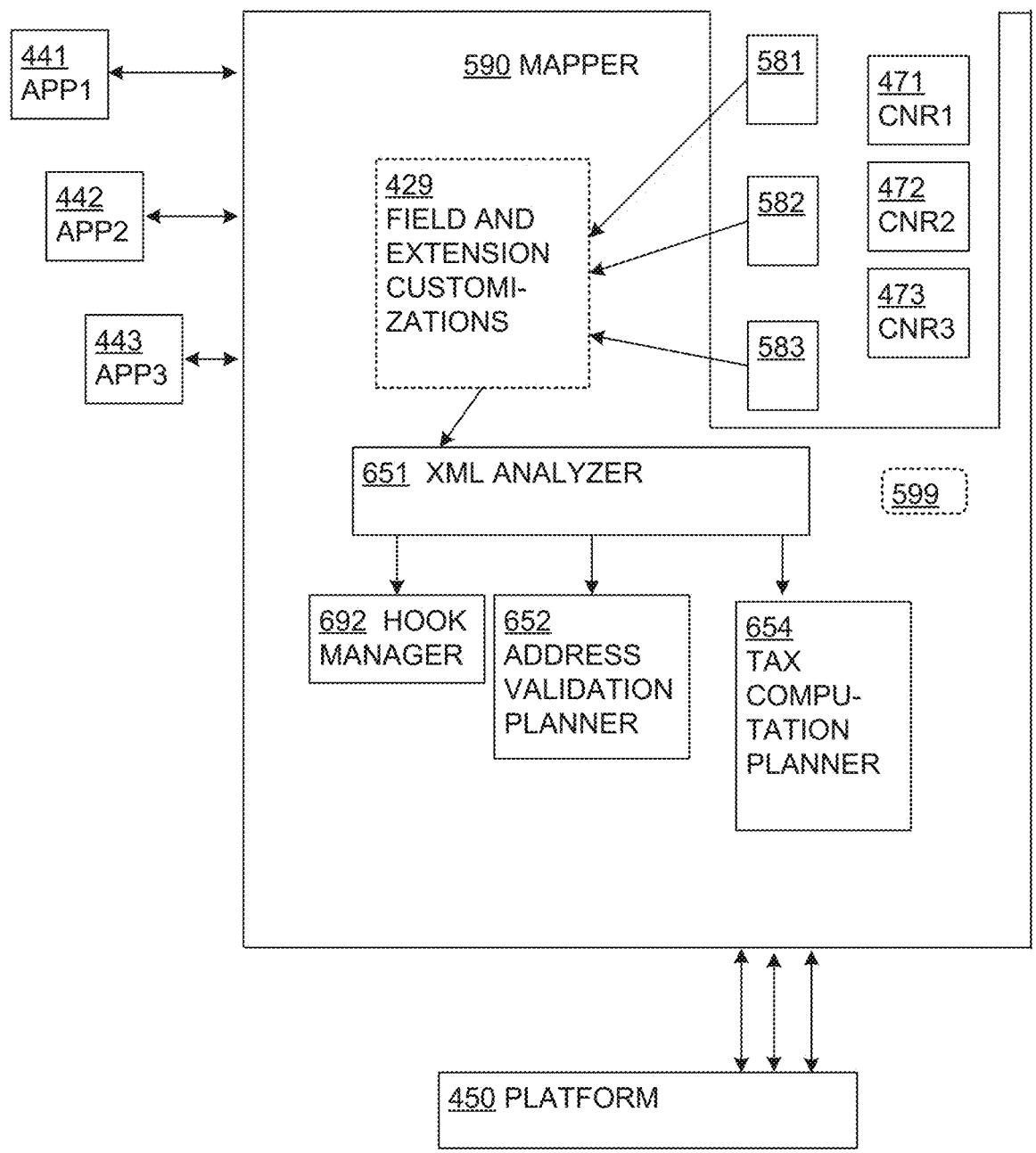

FIG. 6 provides a more detailed functional block view of the ERP 321 in FIG. 5. In this example, an XML analyzer component 651 retrieves and analyzes one or more configuration files 581, 582, 583 and identifies customized fields and extensions 429 defined in the configuration file(s). The customizations are used by tax computation planner 452, 454. User-customizations to hooks in the configuration files 581, 582, 583 identified by the XML analyzer 651 may be used via the hook manager 692.

Operation Examples

Embodiments of software service platforms of the present disclosure may be used in a variety of applications. One example of such an implementation is described below for performing address validation and tax calculation. This embodiment may be referred to as "AvaTax Mapper," "Tax Mapper," or "AvaTax" herein.

Conventional software service platforms often cannot reliably provide accurate tax information in all instances for a variety of reasons. Inaccurate tax information may result in a business overpaying in tax, which is plainly not good business, or in underpaying, for example if whole classes of tax due are missed, such as taxes owed to municipalities.

Businesses are required by law to be tax compliant. To begin with, tax compliance means knowing how much money a business owes in taxes and to which tax authority, and paying it. Not knowing about a tax is not an excuse; if a business fails to accurately report and pay taxes it owes, it may be subject to audits and fines.

Accurate knowing of one's tax liability is rarely easy. Tax may be owed to various tax jurisdictions, such as cities, states, municipalities, and so on, all of each can have different tax rates. There are over 10,000 tax jurisdictions in the US, each with its own rules. In all, there are almost 10 million taxability rules related to various products and services in the US. And, for a single transaction, there may be more than one tax jurisdiction that money is owed to.

Makers of goods may be subject to excise taxes, and excise taxes may thus impact the supply chain. Plus, when businesses make, sell, and/or buy goods, more taxes and requirements may come due. Such taxes include sales tax, use tax, value-added tax, and so on, possibly to multiple jurisdictions from a single sale. For each sale, the seller must determine whether, and when, it must collect sales tax in each tax jurisdiction. For each state, a seller may need to register with that state's taxing agency, set up internal processes for collecting sales tax in accordance with the tax rules and the timetables of the state, keep records for the collected sales tax, file reports with the state, and finally pay the tax to the state.

Each jurisdiction has its own rules about sales tax for those who sell items. In addition, the rules for determining the sales tax due may arise from the location of the buyer and the seller, or that of a distributor, etc. For instance, some state and local authorities have origin-based rules, which means that a sales tax is charged from the seller's location, while other state and local authorities have destination-based rules, which means that a sales tax is charged from the buyer's location. In each instance the seller must collect, report, and pay the correct amount for each locality.

Some jurisdictions exempt the sale of some items from sales tax, but that requires detailed research. For instance, deodorant may be taxable in 2018 in one state, but antiperspirant may be tax exempt. At the same time, a particular type of product may be exempt from sales tax in one state, but not in another state.

Tax compliance even includes requirements for some situations where sales tax is not due. For instance, when a seller buys certain items for resale, the items may be exempt from sales tax, as long as the seller creates and maintains proper certificates.

AvaTax® Mapper helps address these and other issues by providing is a framework that helps users create Address Validation and Tax Calculation requests based upon an XML configuration file. It includes a large library for Analyzing the XML file and formulating the service request models. It supports a variety of Salesforce-based products like CPQ and Billing.

Figure 7A:
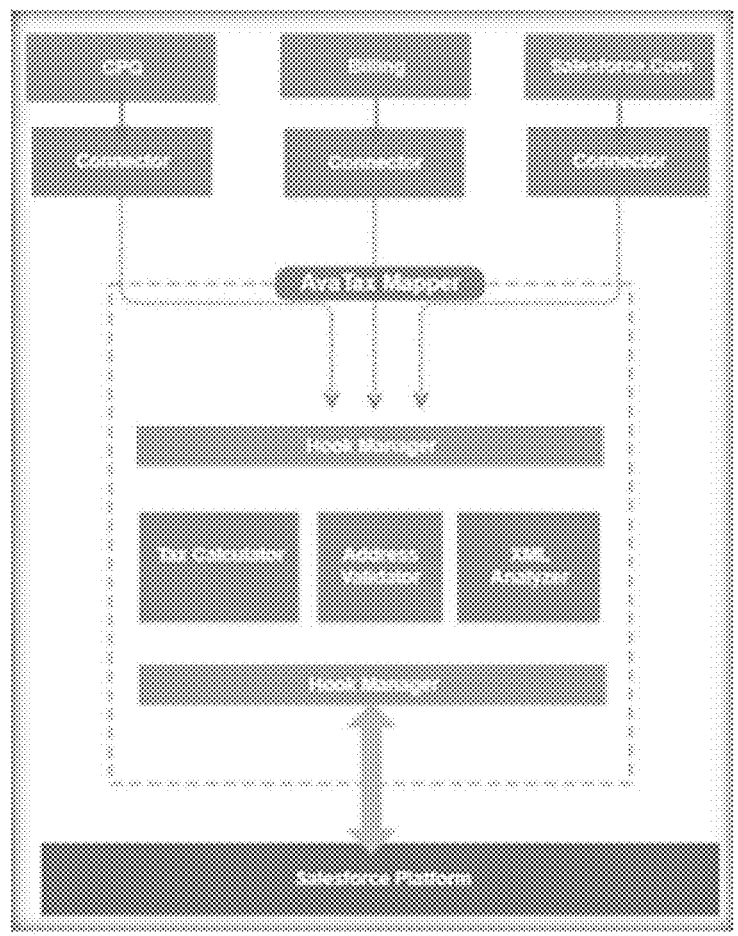
FIGS. 7A, 7B, and 7C are functional diagrams according to various embodiments of the present disclosure.

In one exemplary embodiment, The architecture of the Tax Mapper includes the following components as shown in FIG. 7A: an XML Analyzer, a Tax Calculator, an Address Validator, and a Hook Manager.

In this example, the XML analyzer provides a platform for reading XML configuration file, which extracts a meaningful data and converts it into a map/dictionary of an understandable data type. This map/dictionary plays an important role while creating service request objects required by AvaTax® services.

The Tax Calculator class handles all the complexities of creating tax calculation request from an XML file. It also provides out of the box Hooks, which can be extended by the customers to override the default flow of the AvaTax® Mapper. So that it can fit into their business process if required. The following extension methods are provided for tax calculation: Before Tax Calculation; Tax Validation; Override Request Line; Before Update; and After Update.

The Address Validator class handles all the complexities of creating address validation request and displaying the validated address on the separate page. It also provides an option to update the original address if the user wants to update the address.

The hook manager is the core of providing extension, so that the customer/SI partners can modify the web request that is going to the AvaTax® engine. The administrator or developer needs to create a class, which implements a particular interface for accomplishing certain modification in the system to handle custom business requirement. Then the user can provide the class name in XML config file. The hook manager takes into consideration about the extensions that have been provided in XML config.

Figure 7B:
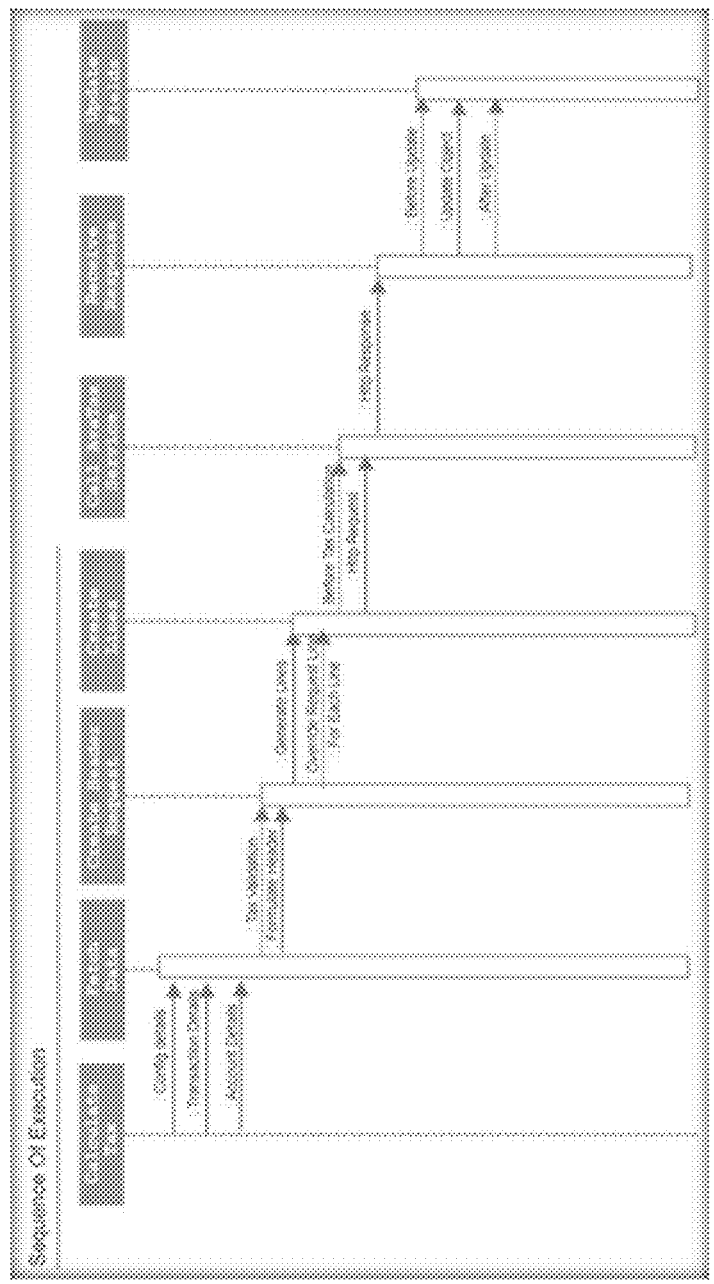
Figure 7C:
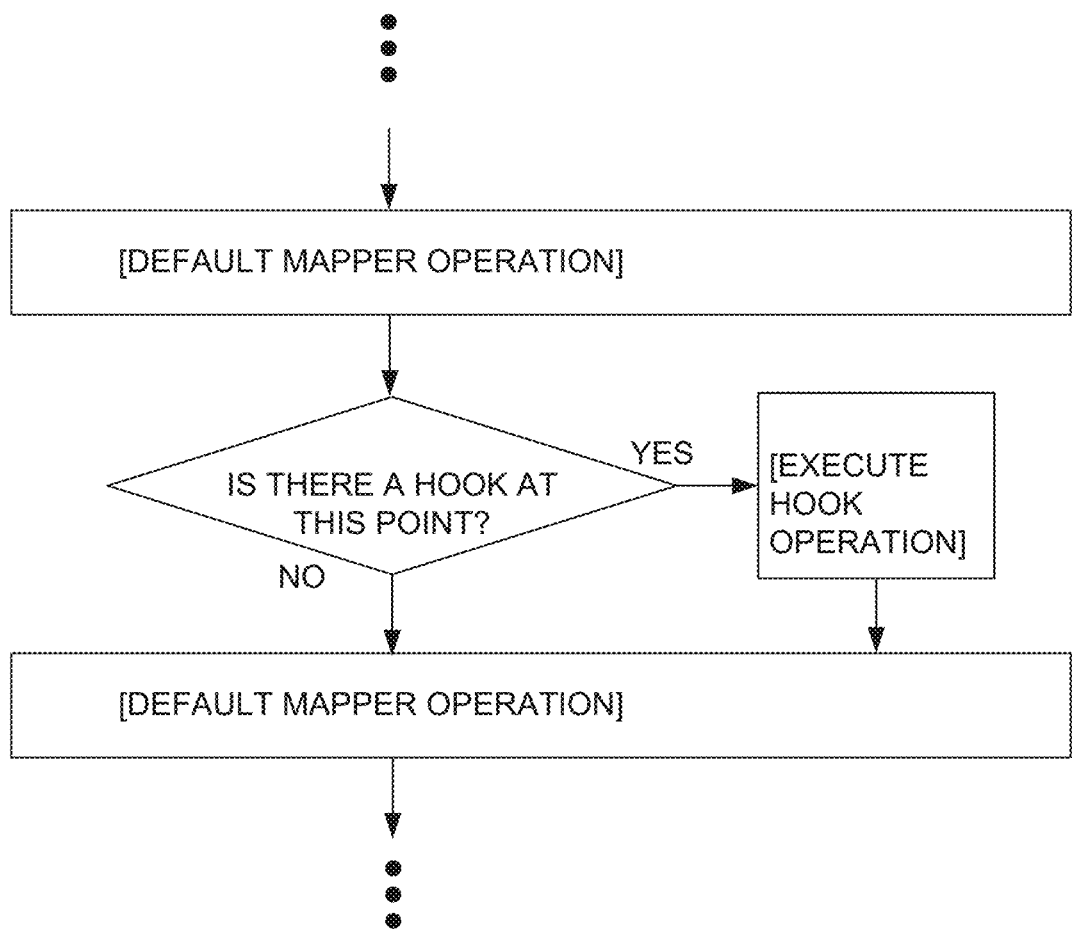
Figure 7D:
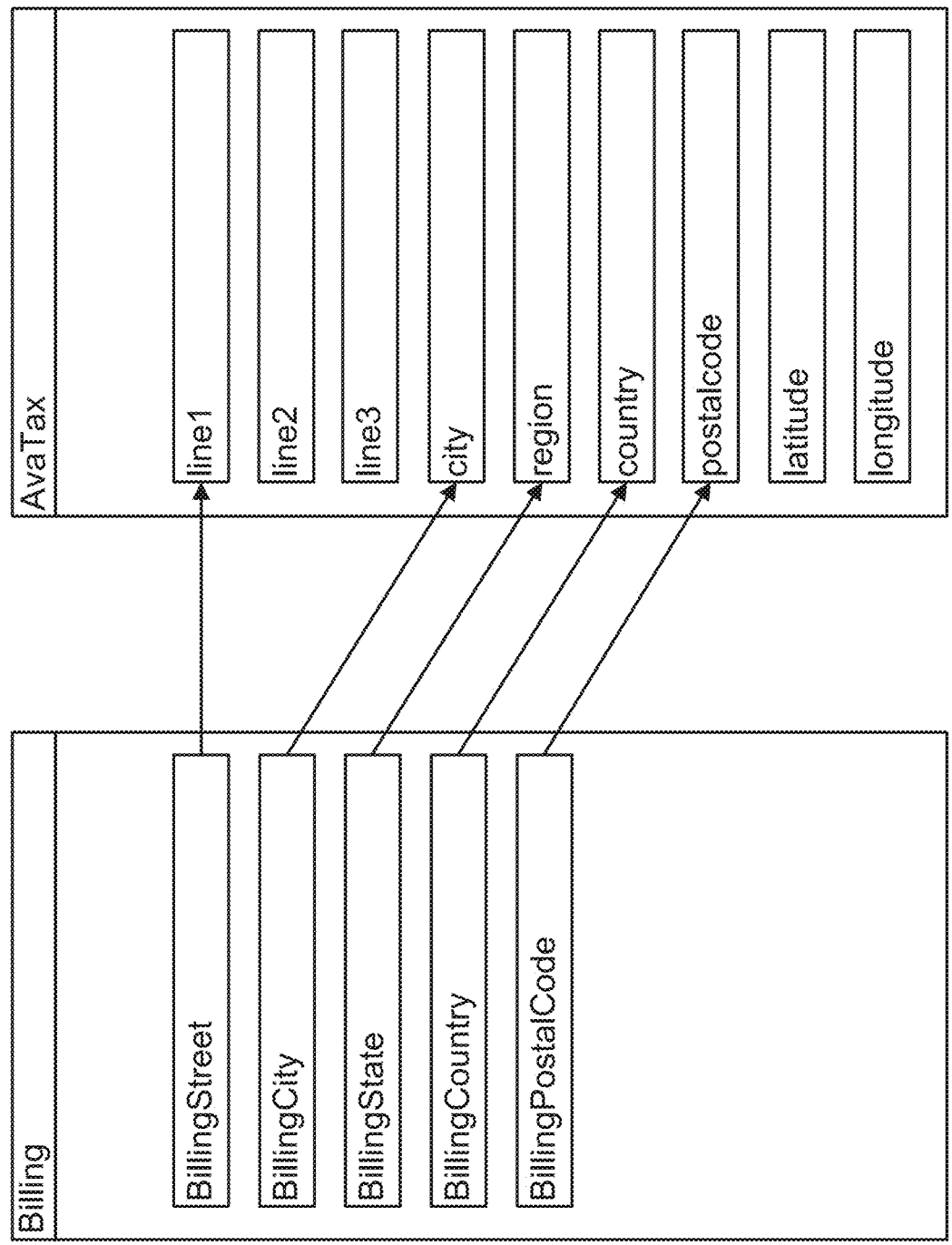
FIGS. 7D-7S depict examples of user interfaces according to various embodiments of the present disclosure.
Figure 7E:
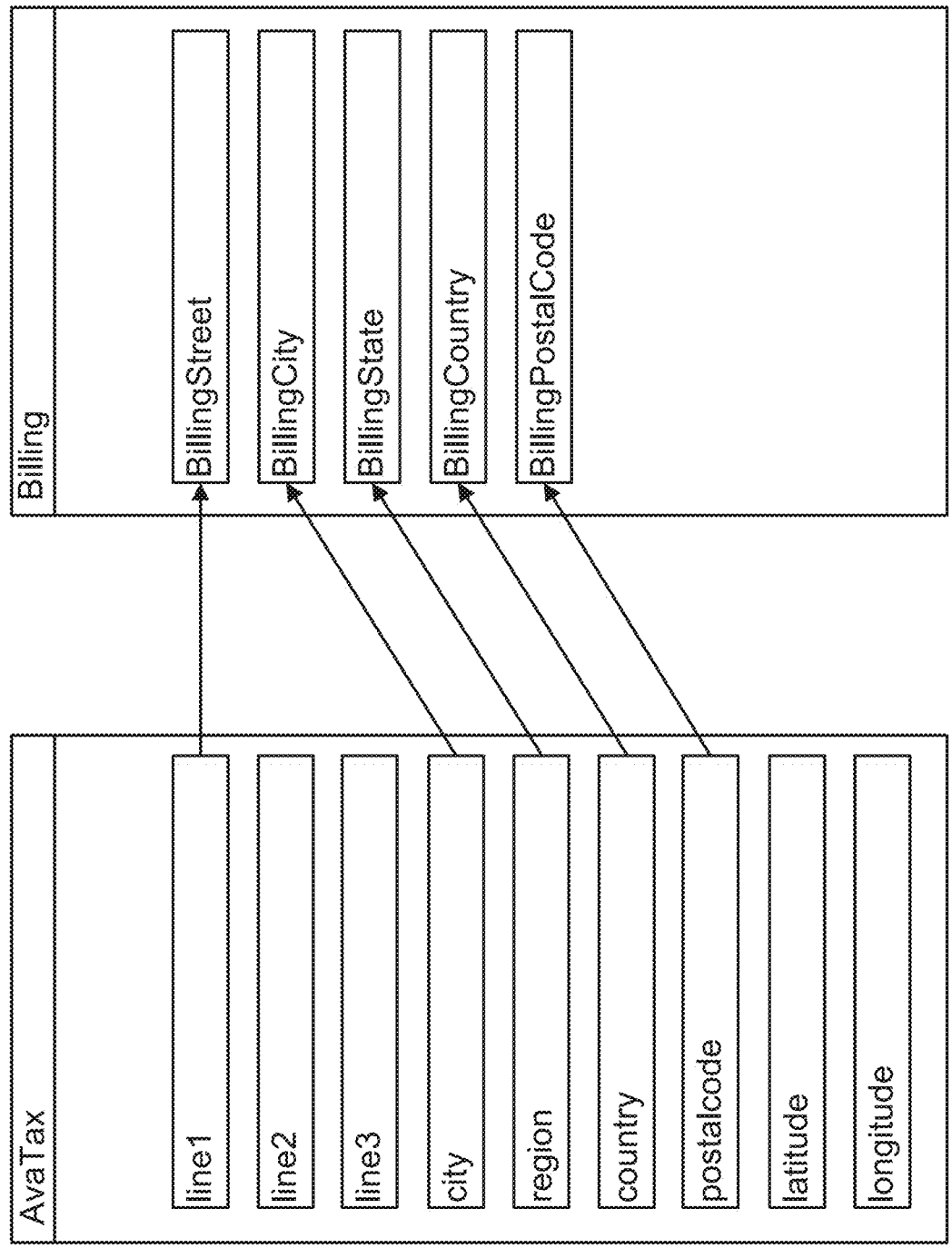
Figure 7F:
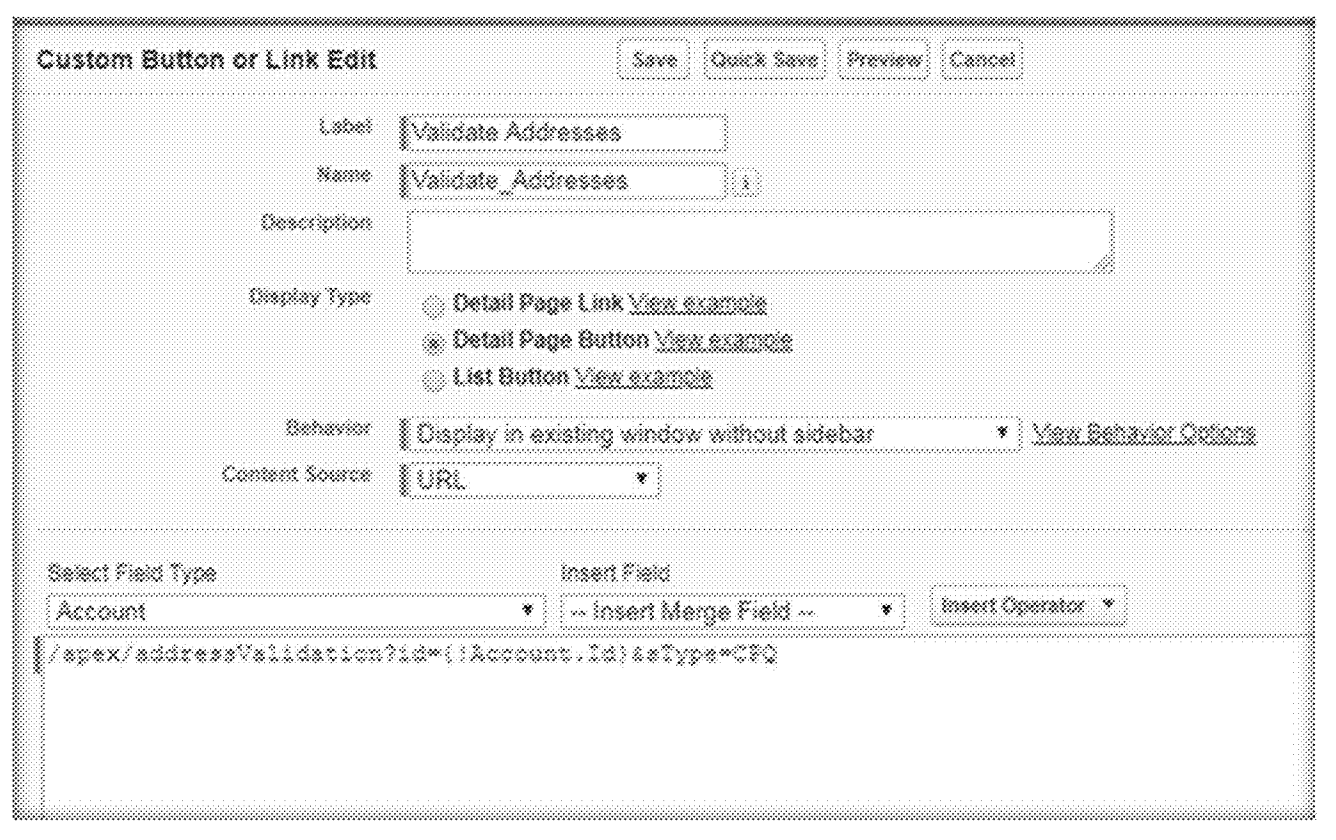
Figure 7G:
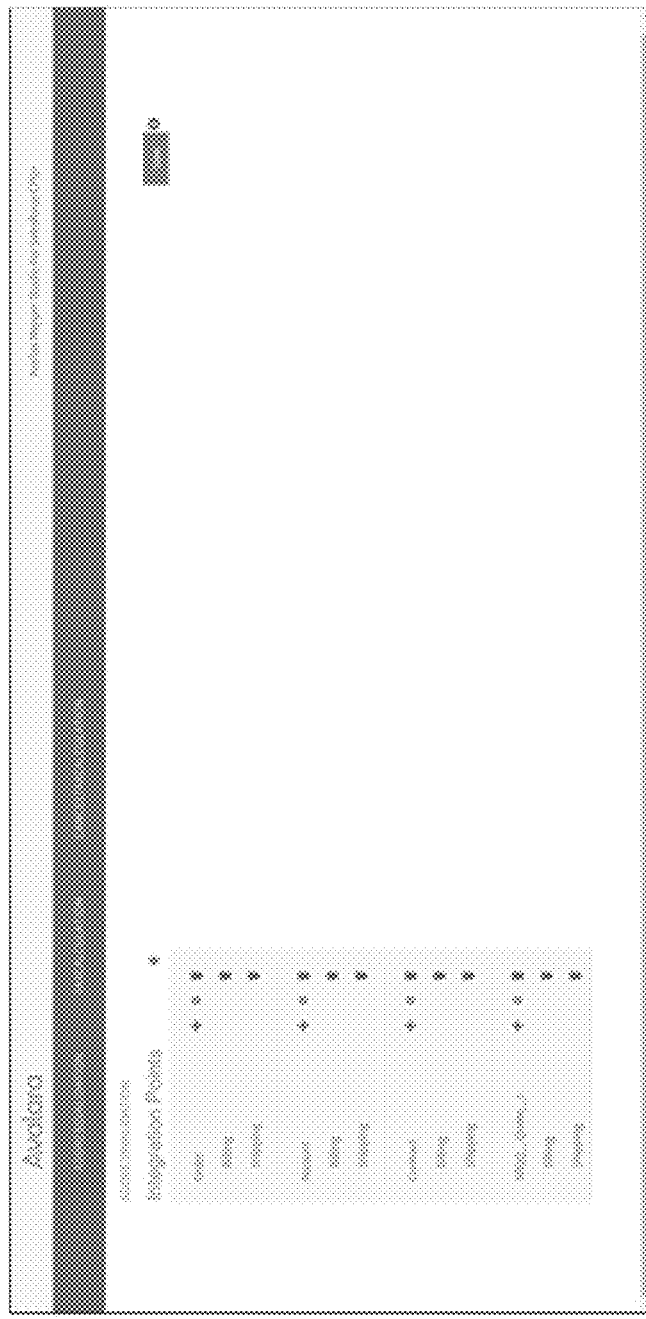

To elaborate more about the hook manager and the extensions which we provide, consider the sequence diagram in FIG. 7B. In this example, the solid arrows illustrate actions taken by the Tax Calculator class, whereas the dotted arrows represent the hooks that can be customized by a user (e.g., an administrator or developer):

The AVATAX® Mapper XML configuration file helps to specify "Request| Response" parameter for consuming AvaTax® service. The Mapper XML is part of the Base AvaTax® package. The XML formulate the request and upgrade the response for Tax Calculation, Address Validation, and Document Commits. This topic describes the main configuration settings that you can make in the AVATAX® XML-.config file.

Configuration File Section

The XML configuration file is divided in various node that are specified as:

---
XML Scaffold

```
<avatax>
    <FeatureNode1>
     <ObjectNode1>
        <ObjectComponent1>
           <Hook></Hook>
           <QueryNode></QueryNode>
           <ParameterNode> </ParameterNode>
           <MappingNode></MappingNode>
           <UpdateMappingNode> </UpdateMappingNode>
        </ObjectComponent1>
     </ObjectNode1>
      . . .
      <ObjectNode n> </ObjectNode n>
    </FeatureNode1>
    . . .
    <FeatureNode n></FeatureNode n>
</avatax>
```
---

Beginning Node

This node specifies the beginning of the AVATAX XML Mapper file. For example, <avatax></avatax>.

Feature Node

This node specifies the beginning of the function name that needs to be covered under the XML. Based on the value and purpose, the AVATAX® Salesforce® Core package decides, which AVATAX® API need to call. For example, <addressvalidation> </addressvalidation>.

Object Node

This node specifies a Salesforce® Object for Feature Node. For example, <Account></Account>.

Object Component

This node specifies the Object Component that needs to be considered for the Feature node. For example, Billing Address From Account to be considered for Address Validation.

The account contains two Addresses "Billing and Shipping." In this example, you are considering Billing Address. For example, Feature Node=Address Validation; Object Node=Account; and Object Component=Billing.

The object component contains the following nodes: a Query Node; a Parameter Node; a Mapping Node, and an Update Mapping Node.

The Query Node specifies the object query language (OQL) (e.g., Salesforce® OQL) that need to query for fetching the attribute of the Object Component specified in the Object Component Node. This node specifies the attribute that needs to be queried and can be further specified for the Mapping Node.

---
```
<query>
select BillingStreet,
BillingCity,BillingState,BillingCountry,Billingpostalcode from
Account   where id ='{AccountId}'
</query>
```
---

The Parameter Node specifies the attribute that needs to be used for the WHERE clause in SOQL specified in Query Node.

---
```
<query>
select BillingStreet,
BillingCity,BillingState,BillingCountry,Billingpostalcode from
Account where id = '{AccountId}'
</query>
<parameters>
   <AccountId>Id</AccountId>
</parameters>
```
---

Note: The id—<AccountId>Id</AccountId> here is the record id of the object.

The Mapping node specifies the Request parameters required for Request creation for Feature Node. Each parameter in the node is a Feature Request Parameter.

---
```
<Mapping>
    <line1>BillingStreet</line1>
    <city>BillingCity</city>
    <region> BillingState </region>
    <country>BillingCountry</country>
    <postalcode> Billingpostalcode </postalcode>
</Mapping>
```

The Update Mapping Node specifies the Response field, where Service Response needs to be shown. For example, Address Validation Feature.

```
<UpdateMapping>
    <line1>BillingStreet</line1>
        <city>BillingCity</city>
        <region> BillingState </region>
        <country>BillingCountry</country>
        <postalcode> Billingpostalcode </postalcode>
</UpdateMapping>
```

Sample Tax Calculation XML

The XML hierarchy remains the same till the Object Node, and the change from Object Component Node are:

Let's now consider Tax Calculation XML

Header Node

This node is used for specifying the Header of the Tax Calculation request.

The header node contains the following nodes below:

Query Node

This node specifies the SOQL that need to query for fetching the attribute of the Object Component specified in the Object Component Node. Also, specifies the attribute to be queried and can be further specified for the Mapping Node.

```
<query>
select Id, AccountId,SalesTax__c,CloseDate,LeadSource from
Opportunity where id =
'{OpportunityId}'
</query>
```

Parameter Node

This node specifies the attribute to be used for the WHERE clause in SOQL specified in Query Node.

```
<query>
select Id, AccountId,SalesTax__c,CloseDate,LeadSource from
Opportunity where id =
'{OpportunityId}'
</query>
<parameters>
    <OpportunityId>Id</OpportunityId>
</parameters>
```

Note: The id—<OpportunityId>Id</OpportunityId> here is the record id of the object.

Mapping Node

This node specifies the Request parameters essential for Request creation for Feature Node. Also, each parameter in the node is a Feature Request Parameter.

```
<Mapping>
    <code>Id</code>
    <customerCode>AccountId</customerCode>
    <description>LeadSource</description>
</Mapping>
```

Update Mapping Node

This node specifies the Response field, and where Service Response needs to be shown. For example, Address Validation Feature.

```
<UpdateMapping>
    < SalesTax__c >totalTax</line1>
</UpdateMapping>
```

Line Node

This node is used for specifying the Line of the Tax Calculation request.

The line node contains the below nodes:

Query Node

This node specifies the SOQL that need to be queried for fetching the attribute of the Object Component specified in the Object Component Node.

This node specifies attribute to be queried and can be further specified for the Mapping Node.

```
<query>
select Id, Pricebookentry.product2.ProductCode, Description,
SalesTax__c,
Quantity, TotalPrice, UnitPrice from OpportunityLineItem where
OpportunityId =
'{OpportunityId}'
</query>
```

Parameter Node

This node specifies the attribute to be use for the WHERE clause in SOQL specified in Query Node.

```
<query>
select Id, Pricebookentry.product2.ProductCode, Description,
SalesTax__c,
Quantity, TotalPrice, UnitPrice from OpportunityLineItem where
OpportunityId =
'{OpportunityId}'
</query>
<parameters>
    <OpportunityLineId>Id</ OpportunityLineId >
</parameters>
```

Note: The id—<Opportunity LineId>Id</OpportunityLineId> here is the record id of the object.

Mapping Node

This node specifies the Request parameters essential for Request creation for Feature Node.

Each parameter in the node is a Feature Request Parameter.

```
<Mapping>
    <quantity> Quantity </code>
    <itemCode> Pricebookentry.product2.ProductCode </customerCode>
    <amount> TotalPrice </description>
</Mapping>
```

Update Mapping Node

This node specifies the Response field, and where Service Response needs to be shown. For example, Address Validation Feature.

```
<UpdateMapping>
    <SalesTax__c >totalTax</line1>
</UpdateMapping>
```

How to Use AvaTax Mapper?

Address Validation

Address Validation follows easy and convenient approach using AvaTax Mapper.

Consider you need to have Address Validation on Account Object, and then you need to follow these steps:

Steps

As depicted in FIG. 7F, create a Button on the Object where Tax Calculation needs to be done. Select the Content Source as URL for the button. In URL box enter the data:

```
/apex/address Validation?id={ ! Account.Id } &sType=CPQ
```

In the example depicted in FIG. 7F, {!Account.id} specifies the Object id for Object where Address Validation need to be done.

AvaTax XML

```xml
<addressvalidation>
  <Account>
    <Billing>
      <query>select BillingStreet,
BillingCity,BillingState,BillingCountry,Billingpostalcode from
Account where id =
'{AccountId}'</query>
      <parameters>
        <AccountId>Id</AccountId>
      </parameters>
      <Mapping>
        <line1>BillingStreet</line1>
        <city>BillingCity</city>
        <region>BillingState</region>
        <country>BillingCountry</country>
        <postalcode>Billingpostalcode</postalcode>
      </Mapping>
      <UpdateMapping>
        <line1>BillingStreet</line1>
        <city>BillingCity</city>
        <region>BillingState</region>
        <country>BillingCountry</country>
        <postalcode>Billingpostalcode</postalcode>
      </UpdateMapping>
    </Billing>
  </Account>
</addressvalidation>
```

Common Configuration

```
global class Configuration extends ConfigurationBase{
  public Configuration( )
  {
    environment = AvaTaxEnvironment.Sandbox;
    companyCode = 'AvaTax Company Code';
    username = 'AvaTax Username';
    password = 'AvaTax Password';
    isTaxCalculationEnabled = true;
  }
}
```

Tax Calculation

Tax Calculation is easy and convenient using AvaTax Mapper.

Steps

Create a Visualforce page and add the Apex class as Controller Extension as shown One must create a Configuration file for Config fetching, and the usage is depicted in Class TaxCalculator.

Visualforce Page

```
<apex:page standardController="Account" extensions="
TaxCalculator" action=" taxCalculator">
</apex:page>
```

Apex Class

```
Public class TaxCalculator
{
Public void taxCalculator( ) {
  Configuration cm = new Configuration( );
  ConfigurationBase config = cm.getConfig( );
    Map<String, String> oppParam = new Map<String,String>( );
  TaxCalculationInput taxCalcInput = new TaxCalculationInput( );
    taxCalcInput.recordId = opp.id;
    taxCalcInput.controller =
opp.id.getSObjectType( ).getDescribe( ).getName( ).toLowerCase( );
    taxCalcInput.optionalParams = oppParam;
    taxCalc.calculateTax(taxCalcInput);
  }
}
```

Create a button on an Object and the Content Source for the button>Visualforce Page Add the Visualforce Page create in step 2 and create the button.

For the scope of this example, we have created a field "SalesTax_c" on Opportunity and Opportunity product to show the response from the tax service.

Sample XML

```xml
<Opportunity>
  <query>select Id, AccountId,SalesTax__c,CloseDate,LeadSource
from Opportunity where id = '{OpportunityId}'</query>
  <parameters>
    <OpportunityId>Id</OpportunityId>
  </parameters>
  <Mapping>
    <code>Id</code>
    <customerCode>AccountId</customerCode>
    <description>LeadSource</description>
  </Mapping>
  <UpdateMapping>
    <SalesTax__c>totalTax</SalesTax__c>
  </UpdateMapping>
</Opportunity>
```

AvaTax XML

```xml
<taxcalculation>
  <Opportunity>
    <hooks>
      <overriderequestline></overriderequestline>
      <beforetaxcalculation></beforetaxcalculation>
      <beforeupdate></beforeupdate>
      <afterupdate></afterupdate>
    </hooks>
    <Header>
      <Queries>
        <Opportunity>
          <query>select Id, AccountId,SalesTax__c,CloseDate,LeadSource from
```

```
Opportunity where id = '{OpportunityId}'</query>
            <parameters>
               <OpportunityId>Id</OpportunityId>
            </parameters>
            <Mapping>
               <code>Id</code>
               <customerCode>AccountId</customerCode>
               <description>LeadSource</description>
            </Mapping>
            <UpdateMapping>
               <SalesTax__c>totalTax</SalesTax__c>
            </UpdateMapping>
         </Opportunity>
         <Account>
            <query>select Id, AccountNumber, Name, ShippingStreet, ShippingCity,
ShippingState, Shippingpostalcode, ShippingCountry,
               BillingStreet, BillingCity, BillingState, Billingpostalcode, BillingCountry
from Account where Id = '{AccountId}'</query>
            <parameters>
               <AccountId>Opportunity.AccountId</AccountId>
            </parameters>
            <Mapping>
               <exemptNo>AccountNumber</exemptNo>
               <addresses.shipTo.line1>ShippingStreet</addresses.shipTo.line1>
               <addresses.shipTo.line2 />
               <addresses.shipTo.line3 />
               <addresses.shipTo.city>ShippingCity</addresses.shipTo.city>
               <addresses.shipTo.region>ShippingState</addresses.shipTo.region>
               <addresses.shipTo.country>ShippingCountry</addresses.shipTo.country>
<addresses.shipTo.postalcode>Shippingpostalcode</addresses.shipTo.postalcode>
               <addresses.shipTo.latitude></addresses.shipTo.latitude>
               <addresses.shipTo.longitude></addresses.shipTo.longitude>
               <addresses.shipFrom.line1>BillingStreet</addresses.shipFrom.line1>
               <addresses.shipFrom.line2 />
               <addresses.shipFrom.line3 />
               <addresses.shipFrom.city>BillingCity</addresses.shipFrom.city>
               <addresses.shipFrom.region>BillingState</addresses.shipFrom.region>
               <addresses.shipFrom.country>BillingCountry</addresses.shipFrom.country>
   <addresses.shipFrom.postalcode>Billingpostalcode</addresses.shipFrom.postalcode>
               <addresses.shipFrom.latitude></addresses.shipFrom.latitude>
               <addresses.shipFrom.longitude></addresses.shipFrom.longitude>
            </Mapping>
            <UpdateMapping>
                 <SalesTax__c>totalTax</SalesTax__c>
            </UpdateMapping>
         </Account>
      </Queries>
   </Header>
   <Line>
      <Queries>
         <OpportunityLineItem>
            <query>select Id, Pricebookentry.product2.ProductCode, Description,
SalesTax__c,
               Quantity, TotalPrice, UnitPrice from OpportunityLineItem where
Opportunity Id = '{OpportunityId}'</query>
            <parameters>
               <OpportunityId>Opportunity.Id</OpportunityId>
            </parameters>
            <Mapping>
               <description>Description</description>
               <quantity>Quantity</quantity>
               <itemCode>Pricebookentry.product2.ProductCode</itemCode>
               <amount>TotalPrice</amount>
            </Mapping>
            <UpdateMapping>
               <SalesTax__c>tax</SalesTax__c>
            </UpdateMapping>
         </OpportunityLineItem>
      </Queries>
   </Line>
</Opportunity>
</taxcalculation>
```

Post-Tax Calculation

Post-Tax Calculation is easy and convenient using Ava-Tax Mapper.

Steps

Create a Visualforce page and add the Apex class as Controller Extension as shown One must create a Configuration file for Config fetching, and the usage is depicted in Class TaxCalculator.

Visualforce Page

```
<apex:page standardController="Account" extensions=" PostTaxCalculator" action=" taxCalculator">
</apex:page>
```

Apex Class

```
Public class PostTaxCalculator
{
Public void taxCalculator( ) {
     Configuration cm = new Configuration( );
     ConfigurationBase config = cm.getConfig( );
       Map<String,String> oppParam = new Map<String,String>( );
     PostTaxCalculator ptc = new PostTaxCalculator('CPQ',config);
     PostTaxCalculationInput postTaxCalcinput =
     new PostTaxCalculationInput( );
     postTaxCalcInput.companyCode = 'DEFAULT';
     postTaxCalcInput.transactionCode = String.valueof(opp.id);
     postTaxCalcInput.commitFlag = true;
     postTaxCalcInput.docType = DocumentType.SalesInvoice;
        ptc.postTax(postTaxCalcInput);
   }
}
```

Create a button on an Object and the Content Source for the button>Visualforce Page Add the Visualforce Page create in step 2 and create the button.

AvaTax XML

```
<posttaxcalculation>
     <Opportunity>
        <hooks>
        </hooks>
        <Queries>
     <Opportunity>
           <query>select Id, AccountId,SalesTax__c,CloseDate,LeadSource from Opportunity where id = '{OpportunityId}'</query>
           <parameters>
             <OpportunityId>Id</OpportunityId>
           </parameters>
           <Mapping>
          <transactionCode>Id </transactionCode>
  </Mapping>
  </Queries>
     </Opportunity>
   </posttaxcalculation>
```

Cancel Tax Calculation

Cancel Tax Calculation is easy and convenient using AvaTax Mapper.

Steps

Create a Visualforce page and add the Apex class as Controller Extension as shown One must create a Configuration file for Config fetching, and the usage is depicted in Class TaxCalculator.

Visualforce Page

```
<apex:page standardController="Account" extensions=" CancelTaxCalculator" action=" taxCalculator">
</apex:page>
```

Apex Class

```
Public class CancelTaxCalculator
{
Public void taxCalculator( ) {
    Configuration cm = new Configuration( );
    ConfigurationBase config = cm.getConfig( );
        Map<String,String> oppParam = new Map<String,String>( );
    CancelTaxCalculationInput cancelTaxCalcInput = new
CancelTaxCalculationInput( );
    cancelTaxCalcInput.recordId = opp.id;
    cancelTaxCalcInput.controller =
```

-continued

```
opp.id.getSObjectType( ).getDescribe( ).getName( ).toLowerCase( );
    cancelTaxCalcInput.optionalParams = oppParam;
    cancelTaxCalcInput.companyCode = 'DEFAULT';
    cancelTaxCalcInput.transactionCode = String.valueof(opp.id);
    cancelTaxCalcInput.code = VoidReasonCode.DocVoided;
    cancelTaxCalcInput.docType = DocumentType.SalesInvoice;
        ctc.cancelTax(cancelTaxCalcInput);
    }
}
```

Create a button on an Object and the Content Source for the button>Visualforce Page Add the Visualforce Page create in step 2 and create the button.

Apex Class

```
<canceltaxcalculation>
        <Opportunity>
        <hooks>
        </hooks>
        <Queries>
    <Opportunity>
        <query>select Id, AccountId,SalesTax__c,CloseDate,LeadSource from
Opportunity where id = '{OpportunityId}'</query>
        <parameters>
            <OpportunityId>Id</OpportunityId>
        </parameters>
        <Mapping>
            <transactionCode>Id </transactionCode>
    </Mapping>
    </Queries>
        </Opportunity>
</canceltaxcalculation>
```

Hooks Manager

This manager is the core of providing extension so that customer/SI partners can modify the web request that is going to AvaTax engine.

Hook manager takes into consideration about the extensions that have been provided in XML config.

Hooks available for tax calculation are below:

AvaTax XML

```
        <taxcalculation>
            <Order>
            <hooks>
                <overriderequestline></overriderequestline>
                <beforetaxcalculation></beforetaxcalculation>
                <beforeupdate></beforeupdate>
                <afterupdate></afterupdate>
            </hooks>
            </Order>
        </taxCalculation>
```

Example for Hooks Definition

```
BeforeTaxCalculationExtender:
    global class BeforeTaxCalculationExtender implements IBeforeTaxCalculation {
        global void hookExtention(CreateTransactionModel model,
    Map<String,List<SObject> > headerResults) {
            model.code = 'overrideDocCode';
        }
    }
```

Now to provide the extension in XML file you need to update XML as follows:

```
<taxcalculation>
    <Order>
        <hooks>
            <overriderequestline></overriderequestline>
            <beforetaxcalculation>BeforeTaxCalculationExtender
            </beforetaxcalculation>
            <beforeupdate></beforeupdate>
            <afterupdate></afterupdate>
        </hooks>
    </Order>
</taxCalculation>
```

AvaTaxClient

| | |
|---|---|
| Description | Initializes Rest client with supplied parameters. |
| Returns | A new object of AvaTaxClient class. |
| Parameters | |
| AppName | Name of calling application. Mostly it is ERP/Salesforce Package Name which is willing to call AvaTax Services. |
| AppVersion | A version of the calling application. |
| MachineName | Name of the machine from which this call is being made. In case of Salesforce, it can be the hostname. |
| Environment | Select whether calls to be made to AvaTax Sandbox or Production environment. |

Methods
WithSecurity

| | |
|---|---|
| Description | Initializes AvaTaxClient class with security information. Note if you want to send username and password for authentication then use this method. |
| Returns | An instance of the AvaTaxClient class. |
| Parameters | |
| Username | Username provided by Avalara. |
| Password | Password provided by Avalara. |

WithSecurity

| | |
|---|---|
| Description | Initializes AvaTaxClient class with security information. Note if you want to send Account Id and License Key for authentication then use this method. |
| Returns | An instance of the AvaTaxClient class. |
| Parameters | |
| AccountId | 10-digit Account Id provided by Avalara. |
| LicenseKey | 16-character License Key provided by Avalara. | resolveAddressPost

| | |
|---|---|
| Description | Retrieve geolocation information for a specified address. If the address can be resolved, then this API provides the latitude and longitude of the resolved location. The value 'resolutionQuality' can be used to identify how closely this address can be located. If the address cannot be located, then use the 'messages' structure to learn more about problems with this address. |
| Returns | |
| Parameters | |
| Model | Instance of AddressValidationInfo. |

CreateTransaction

| | |
|---|---|
| Description | Records a new transaction in AvaTax. A transaction represents a unique potentially taxable action that your company has recorded, and transactions include actions like sales, purchases, inventory transfer, and returns (also called refunds). |
| Returns | TransactionModel as transaction object. |
| Parameters | |
| Model | Instance of CreateTransactionModel. Specifies objects to include in the response after transaction is created |
| Include | Lines<br>Details (implies lines)<br>Summary (implies details)<br>Addresses<br>SummaryOnly (omit lines and details-reduces API response size)<br>LinesOnly (omit details-reduces API response size)<br>ForceTimeout-Simulates a timeout. This adds a 30 second delay and error to your API call. This can be used to test your code to ensure it can respond correctly in the case of a dropped connection. |

CommitTransaction

| | |
|---|---|
| Description | Marks a transaction by changing its status to Committed. Transactions that are committed are available to be reported to a tax authority by Avalara Managed Returns. A transaction represents a unique potentially taxable action that your company has recorded, and transactions include actions like sales, purchases, inventory transfer, and returns (also called refunds). If you have more than one document with the same code, specify the documentType parameter to choose between them. Any changes made to a committed transaction will generate a transaction history. |
| Returns | TransactionModel as transaction object. |
| Parameters | |
| CompanyCode | The company code of the company that recorded this transaction. |
| TransactionCode | The transaction code to commit. |
| Model | Instance of CommitTransactionModel. |
| Document Type | (Optional): The document type of the transaction to void. If not provided, the default is SalesInvoice. |

VoidTransaction

| | |
|---|---|
| Description | Voids the current transaction uniquely identified by this URL. A transaction represents a unique potentially taxable action that your company has recorded, and transactions include actions like sales, purchases, inventory transfer, and returns (also called refunds). When you void a transaction, that transaction's status is recorded as DocVoided. If you have more than one document with the same code, specify the documentType parameter to choose between them. Transactions that have been previously reported to a tax authority by Avalara Managed Returns are no longer available to be voided. |
| Returns | TransactionModel as transaction object. |
| Parameters | |
| CompanyCode | The company code of the company that recorded this transaction. |
| TransactionCode | The transaction code to commit. |
| Model | Instance of VoidTransactionModel. |
| Document Type | (Optional): The document type of the transaction to void. If not provided, the default is SalesInvoice. |

Models

AddressResolutionModel

Description Validated Address Resolution.

Properties

The following are the address resolution model properties and their information:

| Properties | Description | Data Type |
|---|---|---|
| Address | The original address. | AddressInfo |
| Coordinates | The geospatial coordinates of this address. | CoordinateInfo |
| Messages | List of informational and warning messages regarding this address. | AvaTaxMessage |
| resolutionQuality | The resolution quality of the geospatial coordinates = ['NotCoded', 'External', 'CountryCentroid', 'RegionCentroid', 'PartialCentroid', 'PostalCentroidGood', 'PostalCentroidBetter', 'PostalCentroidBest', 'Intersection', 'Interpolated', 'Rooftop', 'Constant']. | resolutionQuality |
| taxAuthorities | List of tax authorities associated with this address. | TaxAuthorityInfo |
| validatedAddresses | The validated address or addresses. | ValidatedAddressInfo |

ValidatedAddressInfo

Description The validated address.

Properties

The following are the validate address info model properties and their information:

| Properties | Description | Data Type |
|---|---|---|
| addressType | Firm or company address General Delivery address High-rise or business complex PO Box address Rural route address | String |
| city | City component of the address. | String |
| country | Name or ISO 3166 code identifying the country. | String |
| latitude | Geospatial latitude measurement, in Decimal Degrees, floating point format. | Double |
| line1 | The first line of the street address. | String |
| line2 | The second line of the street address. | String |
| line3 | The third line of the street address. | String |
| longitude | Geospatial longitude measurement, in Decimal Degrees, floating point format. | Double |
| postalCode | Postal Code/Zip Code component of the address. | String |
| region | Name or ISO 3166 code identifying the region within the country. | String |

AddressInfo
  Description Represents Address for validation or tax calculation.
Properties
  The following are the address info properties and their information:

| Properties | Description | Data Type |
|---|---|---|
| city | City component of the address. | String |
| country | Name or ISO 3166 code identifying the country. | String |
| latitude | Geospatial latitude measurement, in Decimal Degrees, floating point format. | Double |
| line1 | The first line of the street address. | String |
| line2 | The second line of the street address. | String |
| line3 | The third line of the street address. | String |
| longitude | Geospatial longitude measurement, in Decimal Degrees, floating point format. | Double |
| postalCode | Postal Code/Zip Code component of the address. | String |
| region | Name or ISO 3166 code identifying the region within the country. | String |

CoordinateInfo
  Description Validated Address Resolution.
Properties
  The following are the coordinate info properties and their information:

| Properties | Description | Data Type |
|---|---|---|
| latitude | Latitude | Double |
| longitude | Longitude | Double |

AvaTaxMessage
  Description Informational and warning messages regarding the object.
Properties
  The following are the AvaTax message properties and their information:

| Properties | Description | Data Type |
|---|---|---|
| details | Detailed information that explains what the summary provided. | String |
| refersTo | Information about what object in your request this message refers to. | String |
| severity | A category that indicates how severely this message affects the results. | String |
| source | The name of the code or service that generated this message. | String |
| summary | A summary of what this message tells us. | String |

TaxAuthorityInfo
  Description informational and warning messages regarding the address.
Properties
  The following are the tax authority info properties and their information:

| Properties | Description | Data Type |
|---|---|---|
| avalaraId | A unique ID number assigned by Avalara to this tax authority. | String |
| jurisdictionName | The friendly jurisdiction name for this tax authority. | String |
| jurisdictionType | The type of jurisdiction referenced by this tax authority. ['Country', 'State', 'County', 'City', 'Special']. | JurisdictionType |
| signatureCode | An Avalara-assigned signature code for this tax authority. | String |

TransactionModel
  Description Transaction Model.
Properties
  The following are the transaction model properties and their information:

| Properties | Description | Data Type |
|---|---|---|
| addresses | A list of line items in this transaction. | TransactionAddressModel |
| adjustmentDescription | If this transaction has been reported to a tax authority, then this transaction is considered locked and may not be adjusted after reporting. | String |
| adjustmentReason | If this transaction was adjusted, then it indicates the unique ID number of the reason why the transaction was adjusted. | AdjustmentReason |
| batchCode | If this transaction was created as part of a batch, then this code indicates which batch. | String |
| businessIdentificationNo | VAT business identification number used for this transaction. | String |

-continued

| Properties | Description | Data Type |
|---|---|---|
| code | A unique customer-provided code is identifying this transaction. | String |
| companyId | The unique ID number of the company that recorded this transaction. | Long |
| country | If this transaction was adjusted, this indicates the version number of this transaction. Incremented each time the transaction is adjusted. | String |
| currencyCode | The three-character ISO 4217 currency code that was used for payment for this transaction. | String |
| customerUsageType | The customer usage type for this transaction. Customer usage types often affect exemption or taxability rules. | String |
| customerVendorCode | Customer Vendor Code. | String |
| description | Description of this transaction. Field permits unicode values. | String |
| destinationAddressId | The unique ID number of the destination address for this transaction. | Long |
| email | The email address associated with this transaction. | String |
| exchangeRate | If this transaction included foreign currency exchange, this is the exchange rate that was used. | Decimal |
| exchangeRateEffectiveDate | If this transaction included foreign currency exchange, this is the date as of which the exchange rate was calculated. | DateTime |
| exemptNo | If this transaction were exempt, this field would contain the word "Exempt." | String |
| history | If this transaction has been adjusted, this list contains all the previous versions of the document. | TransactionModel |
| id | The unique ID number of this transaction. | Long |
| isSellerImporterOfRecord | If true, this seller was considered the importer of record of a product shipped internationally. | Boolean |
| lines | A list of line items in this transaction. | TransactionLineModel |
| locationCode | (DEPRECATED) This field has been replaced by the reportingLocationCode field. To ensure consistency of field names; Please use reportingLocationCode instead. | String |

| Properties | Description | Data Type |
|---|---|---|
| locationTypes | A list of location types in this transaction. | TransactionLocationTypeModel |
| locked | The two or three-character ISO region code of the region for this transaction. | Boolean |
| messages | List of informational and warning messages regarding this API call. These messages are only relevant to the current API call. | AvaTaxMessage |
| modifiedDate | The date/time when this record was last modified. | DateTime |
| modifiedUserId | The user ID of the user who last modified this record. | Long |
| originAddressId | The unique ID number of the origin address for this transaction. | Long |
| parameters | Contains a list of extra parameters that were set when the transaction was created. | String |
| paymentDate | The date when payment was made on this transaction. By default, this should be the same as the date of the transaction. | DateTime |
| purchaseOrderNo | The customer-supplied purchase order number for this transaction. | String |
| reconciled | If this transaction has been reconciled against the company's ledger, this value is set to true. | Boolean |
| referenceCode | A user-defined reference code for this transaction. | String |
| region | The two-character ISO 3166 code of the country for this transaction. | String |
| reportingLocationCode | If this transaction was made from a specific reporting location, this is the code string of the location. | String |
| salespersonCode | The salesperson who provided this transaction. Not required. | String |
| softwareVersion | The software version used to calculate this transaction. | String |
| status | It shows the status of the transaction. | DocumentStatus |
| summary | It shows the tax summary of the transaction. | TransactionSummary |
| taxDate | Tax date for this transaction. | DateTime |
| taxOverrideAmount | If a tax override was applied to this transaction, then it indicates the amount of tax that was requested by the customer. | Decimal |
| taxOverrideReason | If a tax override was applied to this transaction, indicates | String |

| Properties | Description | Data Type |
| --- | --- | --- |
| | the reason for the tax override. | |
| taxOverrideType | The total amount of this transaction. | TaxOverrideTypeId |
| totalAmount | The total amount of this transaction. | Decimal |
| totalExempt | The amount of this transaction that was exempt. | Decimal |
| totalTax | The total tax calculated for all lines in this transaction. | Decimal |
| totalTaxable | The portion of the total amount of this transaction that was taxable. | Decimal |
| totalTaxCalculated | If a tax override was applied to this transaction, indicates the amount of tax Avalara calculated for the transaction. | Decimal |
| transactionDate | The date on which this transaction occurred. | Date Time |
| type | The type of the transaction. For Returns customers, a transaction type of "Invoice" will be reported to the tax authorities. | DocumentType |
| version | The software version used to calculate this transaction. | Long |

TransactionLocationTypeModel
Description Transaction Location Type Model.
Properties
The following are the transaction location type model properties and their information:

| Properties | Description | Data Type |
| --- | --- | --- |
| documentAddressId | Address ID for the transaction. | Long |
| documentId | Transaction ID. | Long |
| documentLocationTypeId | Location type ID for this location type in transaction. | Long |
| locationTypeCode | Location type code. | String |

TransactionSummary
Description Transaction Summary.
Properties
The following are the transaction summary properties and their information:

| Properties | Description | Data Type |
| --- | --- | --- |
| country | Two-character ISO-3166 country code. | String |
| exemption | The amount of the transaction that was exempt. | Decimal |
| jurisCode | Jurisdiction Code for the taxing jurisdiction. | String |
| jurisName | The name of the jurisdiction that collects this tax. | String |
| jurisType | The type of jurisdiction that collects this tax. | JurisdictionType |
| nonTaxable | The amount of the transaction that was non-taxable. | Decimal |
| rate | Tax Rate-The rate of taxation, as a fraction of the amount. | Decimal |
| rateType | (DEPRECATED) Indicates the tax rate type. Please use rateTypeCode instead. | RateType |
| rateTypeCode | Indicates the code of the rate type. Use '/api/v2/definitions/ratetypes' for a full list of rate type codes. | String |
| region | Two or three-character ISO region, state or province code, if applicable. | String |
| stateAssignedNo | The state assigned a number of the jurisdiction that collects this tax. | String |
| tax | Tax amount-The calculated tax (Base * Rate). | Decimal |
| taxable | Tax Base-The adjusted taxable amount. | Decimal |
| taxAuthorityType | The unique ID of the Tax Authority Type that collects this tax. | Integer |
| taxCalculated | Tax Calculated by Avalara AvaTax. This may be overridden by a TaxOverride.TaxAmount. | Decimal |
| taxGroup | Group code when special grouping is enabled. | String |
| taxName | The name of the tax. | String |
| taxType | The tax type of this tax. | TaxType |

TransactionAddressModel

Description Transaction Address Model.

Properties

The following are the transaction address model properties and their information:

| Properties | Description | Data Type |
|---|---|---|
| boundaryLevel | The boundary level at which this address was validated. | BoundaryLevel |
| city | The city for the address. | String |
| country | The country for the address. | String |
| id | The unique ID number of this address. | Long |
| latitude | Latitude for this address (CALC - 13394). | String |
| line1 | The first line of the street address. | String |
| line2 | The second line of the street address. | String |
| line3 | The third line of the street address. | String |
| longitude | Longitude for this address (CALC - 13394). | String |
| postalcode | Postal Code/Zip Code component of the address. | String |
| region | The region, state, or province for the address. | String |
| taxRegionId | The unique ID number of the tax region for this address. | Long |
| transactionId | The unique ID number of the document to which this address belongs. | Long |

TransactionLineModel

Description Transaction Line Model.

Properties

The following are the transaction line model properties and their information:

| Properties | Description | Data Type |
|---|---|---|
| boundaryOverrideId | The unique ID number of the boundary override applied to this line item. | Long |
| businessIdentificationNo | VAT business identification number used for this transaction. | String |
| certificated | The CertCapture Certificate ID. | String |
| customerUsageType | The customer usage type for this line item. Usage type often affects taxability rules. | String |
| description | A description of the item or service represented by this line. | String |
| destinationAddressId | The unique ID number of the destination address where this line was delivered or sold. | Long |
| details | TransactionLineDetailModel[ ] Optional: A list of location types for this line item. To fetch this list, add the query string "?$include=LineLocationTypes" to your URL. | TransactionLineDetailModel |
| discountAmount | The amount of discount that was applied to this line item. | Decimal |
| discountTypeId | The type of discount, if any, that was applied to this line item. | Long |
| exemptAmount | The amount of this line item that was exempt. | Decimal |
| exemptCertId | The unique ID number of the exemption certificate that applied to this line item. | Long |
| exemptNo | If this line item was exempt, this string contains the word 'Exempt.' | String |
| id | The unique ID number of this transaction line item. | Long |
| isItemTaxable | True if this item is taxable. | Boolean |
| isSSTP | True if this item is a Streamlined Sales Tax line item. | Boolean |
| itemCode | The code string of the item represented by this line item. | String |
| lineAmount | The total amount of the transaction, including both taxable and exempt. | Decimal |
| lineLocationTypes | TransactionLineLocationTypeModel[ ] Optional: A list of location types for this line item. | TransactionLineDetailModel |
| lineNumber | The line number or code indicating the line on this invoice or receipt or document. | String |
| originAddressId | The unique ID number of the origin address where this line was delivered or sold. | Long |
| parameters | Contains a list of extra parameters that were set when the transaction was created. | String |

| Properties | Description | Data Type |
| --- | --- | --- |
| quantity | The quantity of products sold on this line item. | Decimal |
| ref1 | A user-defined reference identifier for this transaction line item. | String |
| ref2 | A user-defined reference identifier for this transaction line item. | String |
| reportingDate | The date when this transaction should be reported. | DateTime |
| revAccount | The revenue account number for this line item. | String |
| sourcing | Indicates whether this line item was taxed according to the origin or destination. | Sourcing |
| tax | The amount of tax generated for this line item. | Decimal |
| taxableAmount | The taxable amount of this line item. | Decimal |
| taxCalculated | The tax calculated for this line by Avalara. | Decimal |
| taxCode | The tax calculated for this line by Avalara. | String |
| taxCodeId | The unique ID number for the tax code that was used to calculate this line item. | Long |
| taxDate | The date that was used for calculating tax amounts for this line item. | DateTime |
| taxEngine | The tax engine identifier that was used to calculate this line item. | String |
| taxIncluded | True if the tax was included in the purchase price of the item. | Boolean |
| taxOverrideAmount | If a tax override was specified, this indicates the amount of tax that was requested. | Decimal |
| taxOverrideReason | If a tax override was specified, represents the reason for the tax override. | String |
| taxOverrideType | If a tax override was specified, this indicates the type of tax override. | TaxOverrideTypeId |
| transactionId | The unique ID number of the transaction to which this line item belongs. | Long |

TransactionLineDetailModel

Description Transaction Line Detail Model.

Properties

The following are the transaction line detail model properties and their information:

| Properties | Description | Data Type |
| --- | --- | --- |
| addressId | The unique ID number of the address used for this tax detail. | Long |
| country | The two-character ISO 3166 country code of the country where this tax detail is assigned. | String |
| countyFIPS | For U.S. transactions, the Federal Information Processing Standard (FIPS) code for the county where this tax detail is assigned. | String |
| exemptAmount | The amount of this line that was considered exempt in this tax detail. | Decimal |
| exemptReasonId | The unique ID number of the exemption reason for this tax detail. | Long |
| exemptUnits | A number of units in this line item that were calculated to be exempt according to this rating detail. | Decimal |
| id | The unique ID number of this tax detail. | Long |
| inState | True if this detail element represented an in-state transaction. | Boolean |
| jurisCode | The code of the jurisdiction to which this tax detail applies. | String |
| jurisdictionId | The unique ID number of the jurisdiction to which this tax detail applies. | Long |
| jurisName | The name of the jurisdiction to which this tax detail applies. | String |
| jurisType | The type of the jurisdiction to which this tax detail applies. | JurisTypeId |
| nonTaxableAmount | The amount of this line item that was considered nontaxable in this tax detail. | Decimal |
| nonTaxableRuleId | The rule according to which portion of this detail was considered nontaxable. | Long |
| nonTaxableType | The type of nontaxability that was applied to this tax detail. | TaxRuleTypeId |
| nonTaxableUnits | A number of units in this line item that were calculated to be nontaxable according to this rating detail. | Decimal |
| rate | The rate at which this tax detail was calculated. | Decimal |

-continued

| Properties | Description | Data Type |
|---|---|---|
| rateRuleId | The unique ID number of the rule according to which this tax detail was calculated. | Long |
| rateSourceId | The unique ID number of the source of the rate according to which this tax detail was calculated. | Long |
| rateType | (DEPRECATED) The rate type for this tax detail. Please use rateTypeCode instead. | RateType |
| rateTypeCode | Indicates the code of the rate type that was used to calculate this tax detail. | String |
| region | The two or three-character ISO region code for the region where this tax detail is assigned. | String |
| serCode | For Streamlined Sales Tax customers, the SST Electronic Return code under which this tax detail should be applied. | String |
| signatureCode | The Avalara-specified signature code of the jurisdiction to which this tax detail applies. | String |
| sourcing | Indicates whether this tax detail applies to the origin or destination of the transaction. | Sourcing |
| stateAssignedNo | The state assigned a number of the jurisdiction to which this tax detail applies. | String |
| stateFIPS | For U.S. transactions, the Federal Information Processing Standard (FIPS) code for the state where this tax detail is assigned. | String |
| tax | The amount of tax for this tax detail. | Decimal |
| taxableAmount | The taxable amount of this tax detail. | Decimal |
| taxableUnits | A number of units in this line item that were calculated to be taxable according to this rating detail. | Decimal |
| taxAuthorityTypeId | The type of the tax authority to which this tax will be remitted. | Long |
| taxCalculated | The amount of tax that was calculated. | Decimal |
| taxName | The name of the tax against which this tax amount was calculated. | String |
| taxOverride | The amount of tax override that was specified for this tax line. | Decimal |
| taxRegionId | The unique ID number of the tax region. | Long |
| taxType | The type of tax that was calculated. Depends on the company's nexus settings as well as the jurisdiction's tax laws. | TaxType |
| transactionId | The unique ID number of this transaction. | Long |
| transactionLineId | The unique ID number of the line within this transaction. | Long |

AddressValidationInfo

| | |
|---|---|
| Description | REST client for Avalara address validation and tax calculation services. @author Avalara ® Salesforce ® Connector Team. |

Properties

The following are the address validation info properties and their information:

| Properties | Description | Data Type |
|---|---|---|
| city | City component of the address. | String |
| country | Name or ISO 3166 code identifying the country. | String |
| latitude | Geospatial latitude measurement, in Decimal Degrees, floating point format. | Double |
| line1 | The first line of the street address. | String |
| line2 | The second line of the street address. | String |
| line3 | The third line of the street address. | String |
| longitude | Geospatial longitude measurement, in Decimal Degrees, floating point format. | Double |
| postalcode | Postal Code/Zip Code component of the address. | String |
| region | Name or ISO 3166 code identifying the region within the country. | String |
| textcase | Specify the text case for the validated address result. If not specified, it returns uppercase. = ['Upper', 'Mixed']. | TextCase |

Create TransactionModel
  Description Create Transaction Model.
Properties
  The following are the create transaction model properties and their information:

| Properties | Description | Data Type |
|---|---|---|
| addresses | Default addresses for all lines in this document. | AddressesModel |
| batchCode | BatchCode for batch operations. | String |
| businessIdentificationNo | VAT business identification number for the customer for this transaction. | String |
| code | Transaction Code - the internal reference code used by the client application. | String |
| commitDocument | Causes the document to be committed if true. | Boolean |
| companyCode | Company Code - Specify the code of the company creating this transaction here. | String |

-continued

| Properties | Description | Data Type |
|---|---|---|
| currencyCode | The three-character ISO 4217 currency code for this transaction. | String |
| customerCode | The client application customer reference code. | String |
| customerUsageType | Customer Usage Type - The client application customer or usage type. | String |
| debugLevel | If the user wishes to request additional debug information from this transaction, specify a level higher than 'normal.' | TaxDebugLevel |
| description | User-supplied description for this transaction. | String |
| discount | The discount amount to apply to the document. | Decimal |
| documentDate | The date on the invoice, purchase order. | DateTime |
| email | User-supplied email address relevant for this transaction. | String |
| exchangeRate | Currency exchange rate from this transaction to the company base currency. | Decimal |
| exchangeRateEffectiveDate | The effective date of the exchange rate. | DateTime |
| exemptionNo | Exemption Number for this document. | String |
| isSellerImporterOfRecord | Specifies if the Transaction has the seller as IsSellerImporterOfRecord. | Boolean |
| lines | Document line items list. | LineItemModel |
| parameters | Special parameters for this transaction. | String |
| posLaneCode | Sets the Point of Sale Lane Code sent by the User for this document. | String |
| purchaseOrderNo | Purchase Order Number for this document. | String |
| referenceCode | Customer-provided Reference Code with information about this transaction. | String |
| reportingLocationCode | Sets the sale location code (Outlet ID) for reporting this document to the tax authority. | String |
| salespersonCode | Salesperson Code - The client application salesperson reference code. | String |
| serviceMode | Specifies whether the tax calculation is handled Local, Remote, or Automatic (default). | ServiceMode |
| taxOverride | Specifies a tax override for the entire document. | TaxOverrideModel |
| type | Specifies the type of document to create. | DocumentType |

AddressesModel
Description Wrapper for Address data.
Properties
The following are the addresses model properties and their information:

| Properties | Description | Data Type |
|---|---|---|
| pointOfOrderAcceptance | The place of business where you accept/approve the customer™'s order, thereby becoming contractually obligated to make the sale. | AddressLocationInfo |

| Properties | Description | Data Type |
| --- | --- | --- |
| pointOfOrderOrigin | The place of business where you receive the customer's order. | AddressLocationInfo |
| shipFrom | The origination address where the products were shipped from, or from where the services originated. | AddressLocationInfo |
| shipTo | The destination address where the products were shipped to, or where the services were delivered. | AddressLocationInfo |
| singleLocation | If this transaction occurred at a retail point-of-sale location, provide that single address here and leave all other address types null. | AddressLocationInfo |

AddressLocationInfo

Description Informational about Address data.

Properties

The following are the addresses location info properties and their information:

| Properties | Description | Data Type |
| --- | --- | --- |
| city | City component of the address. | String |
| country | Two-character ISO 3166 Country Code. Call 'ListCountries' for a list of ISO 3166 country codes. | String |
| latitude | Geospatial latitude measurement, in Decimal Degrees, floating point format. | Decimal |
| line1 | The first line of the street address. | String |
| line2 | The second line of the street address. | String |
| line3 | The third line of the street address. | String |
| locationCode | If you wish to use the address of an existing location for this company, specify the address here. | String |
| longitude | Geospatial longitude measurement, in Decimal Degrees, floating point format. | Decimal |
| postalCode | Postal Code/Zip Code component of the address. | String |
| region | State/Province/Region component of the address. | String |

LineItemModel

Description Line Item Model

Properties

The following are the line item model properties and their information:

| Properties | Description | Data Type |
| --- | --- | --- |
| addresses | The addresses to use for this transaction line. | AddressesModel |
| amount | The total amount for this line. | Decimal |
| businessIdentificationNo | VAT business identification number for the customer for this line item. | String |
| customerUsageType | Customer Usage Type - The client application customer or usage type. | String |
| description | Item description. This is required for SST transactions if an unmapped ItemCode is used. | String |
| discounted | True if the document discount should be applied to this line. | Boolean |
| exemptionCode | Exemption number for this line. | String |
| itemCode | Item Code (SKU). | String |
| lineNumber | Line number within this document. | String |
| quantity | Quantity of items in this line. | Decimal |
| ref1 | Reference 1 - Client specific reference field. | String |
| ref2 | Reference 2 - Client specific reference field. | String |

| Properties | Description | Data Type |
|---|---|---|
| revenueAccount | Revenue Account. | String |
| taxCode | Tax Code - System or Custom Tax Code. | String |
| taxIncluded | Indicates if the line has Tax Included; defaults to false. | Boolean |

TaxOverrideModel
  Description Tax Override Model.
Properties
  The following are the tax override model properties and their information:

| Properties | Description | Data Type |
|---|---|---|
| reason | This provides the reason for a tax override for audit purposes. | String |
| taxAmount | Indicates a total override of the calculated tax on the document. | Decimal |
| taxDate | The override tax date to use. | Decimal |
| type | Identifies the type of tax override. | TaxOverrideType |

CommitTransactionModel
  Description Commit Transaction Model.
Properties
  The following are the commit transaction model properties and their information:

| Properties | Description | Data Type |
|---|---|---|
| commitTransaction | Set this value to be true to commit this transaction. | Boolean |

VoidTransactionModel
  Description Void Transaction Model.
Properties
  The following are the void transaction model properties and their information:

| Properties | Description | Data Type |
|---|---|---|
| code | Please specify the reason for voiding or canceling this transaction. | VoidReasonCode |

Enums
BoundaryLevel
  Description The boundary level at which this address was validated.
Properties
  The following are the transaction address model properties and their information:

| Properties | Description |
|---|---|
| Address | Street address precision. |
| Zip9 | 9-digit zip precision. |
| Zip5 | 5-digit zip precision. |

DocumentType

| | |
|---|---|
| Description | Document Type for Tax Calculation |
| Return | NA |

Properties
  The following are the document type properties and their information:

| Properties | Description |
|---|---|
| SalesOrder | Sales Order estimate or quote (default). This is a temporary document type and is not saved in tax history. |
| SalesInvoice | Sales Invoice. |
| PurchaseOrder | Purchase order, estimate, or quote. This is a temporary document type and is not saved in tax history. |
| PurchaseInvoice | Purchase Invoice. |
| ReturnOrder | Sales Return Order. This is a temporary document type and is not saved in tax history. |
| ReturnInvoice | Sales Return Invoice. |
| InventoryTransferOrder | Inventory Transfer Order. |
| InventoryTransferInvoice | Inventory Transfer Invoice. |
| ReverseChargeOrder | Reverse Charge Order. |
| Properties | Description |
| ReverseChargeInvoice | Reverse Charge Invoice. |
| AnyDocumentType | No particular type. |

TaxOverrideTypeId

| | |
|---|---|
| Description | Tax Override Type Id for Tax Calculation. |
| Return | NA |

Properties
  The following are the document type properties and their information:

| Properties | Description |
|---|---|
| None | No override. |
| TaxAmount | The tax was overridden by the client. |
| Exemption | Entity exemption was ignored (For example, consumed item). |
| TaxDate | Only the tax date was overridden. |
| AccruedTaxAmount | To support Consumer Use Tax. |
| DeriveTaxable | Derive the taxable amount from the tax amount. |

VoidReasonCode

Description Void Reason Code.

Properties

The following are the void reason code properties and their information:

| Properties | Description |
|---|---|
| Unspecified | Unspecified reason. |
| PostFailed | Post operation failed-Document status will be changed to unposted. |
| DocDeleted | Document deleted-If committed, document status will be changed to Cancelled. |
| DocVoided | The document has been voided, and DocStatus will be set to Cancelled. |
| AdjustmentCancelled | The adjusttax operation has been canceled. The adjustment will be reversed. |

TaxOverride Type

| Description | Tax Override Type for Tax Calculation. |
|---|---|
| Return | NA |

Properties

The following are the tax override type properties and their information:

| Properties | Description |
|---|---|
| None | No override. |
| TaxAmount | The tax was overridden by the client. |
| Exemption | Entity exemption was ignored (For example, consumed item). |
| TaxDate | Only the tax date was overridden. |
| AccruedTaxAmount | To support Consumer Use Tax. |
| DeriveTaxable | Derive the taxable amount from the tax amount. |

TaxDebugLevel

| Description | Tax Debug Level for Tax Calculation. |
|---|---|
| Return | NA |

Properties

The following are the tax debug level properties and their information:

| Properties | Description |
|---|---|
| Normal | User requests the normal level of debugging information when creating a tax transaction. |
| Diagnostic | User requests additional diagnostic information when creating a tax transaction. |

AdjustmentReason

| Description | Adjustment Reason for Tax Calculation. |
|---|---|
| Return | NA |

Properties

The following are the adjustment reason properties and their information:

| Properties | Description |
|---|---|
| NotAdjusted | The transaction has not been adjusted. |
| SourcingIssue | A sourcing issue existed which caused the transaction to be adjusted. |
| ReconciledWithGeneralLedger | The transaction was adjusted to reconcile it with a general ledger. |
| ExemptCertApplied | The transaction was adjusted after an exemption certificate was applied. |
| PriceAdjusted | The transaction was adjusted when the price of an item changed. |
| ProductReturned | The transaction was adjusted due to a product return. |
| ProductExchanged | The transaction was adjusted due to a product exchange. |
| BadDebt | The transaction was adjusted due to bad or uncollectable debt. |
| Other | The transaction was adjusted for another reason not specified. |

DocumentStatus

| Description | Document Status for Tax Calculation. |
|---|---|
| Return | NA |

Properties

The following are the document status properties and their information:

| Properties | Description |
|---|---|
| SalesOrder | Sales Order estimate or quote (default). This is a temporary document type and is not saved in tax history. |
| SalesInvoice | Sales Invoice. |
| PurchaseOrder | Purchase order, estimate, or quote. This is a temporary document type and is not saved in tax history. |
| PurchaseInvoice | Purchase Invoice. |
| ReturnOrder | Sales Return Order. This is a temporary document type and is not saved in tax history. |
| ReturnInvoice | Sales Return Invoice. |
| InventoryTransferOrder | Inventory Transfer Order. |
| InventoryTransferInvoice | Inventory Transfer Invoice. |
| ReverseChargeOrder | Reverse Charge Order. |
| ReverseChargeInvoice | Reverse Charge Invoice. |
| AnyDocumentType | No type. |

Jurisdiction Type
 Description The type of jurisdiction referenced by the tax authority.
 Properties
  The following are the jurisdiction type properties:
 Properties
  Country
  Composite
  State
  County
  City
  Special
 JurisTypeId

| Description | Juris Type Id for Tax Calculation. |
|---|---|
| Return | NA |

Properties

The following are the juris type id properties and their information:

| Properties | Description |
|---|---|
| STA | State |
| CTY | County |
| CIT | City |
| STJ | Special |
| CNT | Country |

RateType

| Description | Rate Type for Tax Calculation. |
|---|---|
| Return | NA |

Properties
The following are the rate type properties:
Properties
  ReducedA
  ReducedB
  Food
  General
  IncreasedStandard
  LinenRental
  Medical
  Parking
  SuperReduced
  ReducedR
  Standard
  Zero
ResolutionQuality

| Description | The resolution quality of the geospatial coordinates. |
|---|---|
| Return | NA |

Properties
The following are the resolution quality properties:
Properties
  NotCoded
  External
  CountryCentroid
  RegionCentroid
  PartialCentroid
  PostalCentroidGood
  PostalCentroidBetter
  PostalCentroidBest
  Intersection
  Interpolated
  Rooftop
  Constant
TaxRuleTypeId
  Description Tax Rule Type Id.
Properties
  The following are the tax rule type id properties:
Properties
  RateRule
  RateOverrideRule
  BaseRule
  ExemptEntityRule
  ProductTaxabilityRule
  NexusRule TaxType
  Description Tax Type.
Properties
  The following are the tax type properties and their information:

| Properties | Description |
|---|---|
| Lodging | Match Lodging tax type. |
| Bottle | Match bottle tax type. |
| EWaste | EWaste tax type. |
| ConsumerUse | Consumer Use Tax. |
| Excise | Medical Excise Tax. |
| Fee | Fee-PIFs (global Improvement Fees) and RSFs (Retail Sales Fees). |
| Input | VAT/GST Input tax. |
| Nonrecoverable | VAT/GST Nonrecoverable Input tax. |
| Output | VAT/GST Output tax. |
| Rental | Rental Tax. |
| Sales | Sales tax. |
| Use | Use Tax. |

Sourcing
  Description Sourcing for Tax Calculation.
Properties
  The following are the sourcing properties and their information:

| Properties | Description |
|---|---|
| Mixed | Mixed sourcing, for states that do both origin and destination calculation. |
| Destination | Destination |
| Origin | Origin |

ServiceMode
  Description Service Mode
Properties
  The following are the service mode properties and their information:

| Properties | Description |
|---|---|
| Automatic | Automatically use local or remote (default). |
| Local | The local server only. |
| Remote | Remote server only. |

PostTaxCalculator

| Description | Contains methods for Posting tax and updating back to Salesforce object. It reads XML configuration provide and generate post-tax calculation request from the mapping provided in XML configuration file. It supports several hooks that can be subscribed to modify the tax calculation request as per business requirement. |
|---|---|

Properties
  The following are the post-tax calculator properties and their information:

| Properties | Description | Data Type |
|---|---|---|
| headerQueryResult | Stores query wise result of SOQL defined under TaxCalculator-> SalesforceObject-> Header->Queries node. | String |

| Properties | Description | Data Type |
|---|---|---|
| lineQueryResult | Stores query wise result of SOQL defined under TaxCalculator-> SalesforceObject-> Line->Queries node. | String |

Methods
executeQuery

| | |
|---|---|
| Description | Retrieves Data from Salesforce.<br>It also reads all the Queries in XML config provided for the calling package.<br>Moreover, keep it ready for further usage in tax calculation. |
| Returns | NA |
| Parameters | |
| Model | An instance of QueryInput. | postTax

| | |
|---|---|
| Description | This method is responsible for document posting.<br>It formulates the posting document for the calling package. Moreover, provide the Post-Tax Calculation result to the Connector. |
| Returns | An instance of TransactionModel. |
| Parameters | |
| Model | Instance of PostTaxCalculationInput. |

PostTaxCalculator

| | |
|---|---|
| Description | It initializes an instance of PostTaxCalculator class for the Salesforce object provided.<br>It also reads all the XML config provided for the calling package.<br>Moreover, keep it ready for further usage in document posting. |
| Returns | An instance of TaxCalculator class. |
| Parameters | |
| CallingPackage | Name of the package which wants to calculate the tax. |
| Model | AvaTax Configuration details. | setConfigProviderListener

| | |
|---|---|
| Description | Hook Method for getting the config before Post Tax Calculation |
| Returns | None |
| Parameters | |
| Model | Instance of IConfigManagerPost. |

Models
QueryInput
Properties

The following are the query input properties and their information:

| Properties | Description | Data Type |
|---|---|---|
| controller | Name of the object controller. | String |
| optionalParams | Data required for creating parameters in the query. | Map<String, String> |
| recordId | Id of the Salesforce record. | Id |

PostTaxCalculationInput
Description Post Tax details essential for Committing the document.
Properties The following are the post-tax calculator input properties and their information:

| Properties | Description | Data Type |
|---|---|---|
| commitFlag | Flag to commit document, Value can true or false | VoidReasonCode |
| companyCode | CompanyCode for Cancel Tax Calculation. | String |
| docType | DocType for Cancel Tax Calculation. | DocumentType |
| transactionCode | TransactionCode for Cancel Tax Calculation. | String |

TaxCalulator

| | |
|---|---|
| Description | Contains methods for calculating tax and updating back to Salesforce object.<br>It reads XML configuration provide and generate tax calculation request from the mapping provided in XML configuration file.<br>It supports several hooks that can be subscribed to modify the tax calculation request as per business requirement. |

Properties

The following are the tax calculator properties and their information:

| Properties | Description | Data Type |
|---|---|---|
| headerQueryResult | Stores query wise result of SOQL defined under TaxCalculator-> SalesforceObject-> Header->Queries node. | String |
| lineQueryResult | Stores query wise result of SOQL defined under TaxCalculator-> | String |

-continued

| Properties | Description | Data Type |
|---|---|---|
| | SalesforceObject-><br>Line->Queries node. | |

Methods

TaxCalulator

| | | |
|---|---|---|
| Description | It initializes an instance of TaxCalculator class for the Salesforce object provided.<br>It also reads all the XML config provided for the calling package. Moreover, keep it ready for further usage in tax calculation. | |
| Returns | An instance of TaxCalculator class. | |
| Parameters | | |
| CallingPackage | name of the package which wants to calculate the tax. | |
| Config | AvaTax Configuration details | | calculateTax

| | | |
|---|---|---|
| Description | This method is responsible for Tax Calculation.<br>It formulates the Tax for the calling package.<br>Moreover, provide the Tax Calculation result to the Connector. | |
| Returns | An instance of TransactionModel. | |
| Parameters | | |
| Model | Instance of TaxCalculationInput. | | setBeforeTaxCalculationListener

| | |
|---|---|
| Description | Hook Method for editing the header data of Tax Request before Tax Calculation. |
| Returns | None |
| Parameters | |
| Model | Instance of IBeforeTaxCalculation. | setBeforeTaxValidationListener

| | |
|---|---|
| Description | Hook Method for validations if any to be done before actual before Tax Calculation. |
| Returns | None |
| Parameters | |
| Model | Instance of IBeforeTaxValidation. | setConfigProviderListener

| | |
|---|---|
| Description | Hook Method for getting the config before Tax Calculation. |
| Returns | None |
| Parameters | |
| Model | Instance of IBeforeTaxValidation. | setOverrideRequestLineListener

| | |
|---|---|
| Description | Hook Method for editing the line data of Tax Request before Tax Calculation |
| Returns | None |
| Parameters | |
| Model | Instance of IOverrideRequestLine. |

Models

TaxCalculationInput

Properties

The following are the tax calculation input properties and their information:

| Properties | Description | Data Type |
|---|---|---|
| commitFlag | Flag for committing document on AvaTax. | Boolean |
| controller | Name of the Salesforce object. | String |
| docType | AvaTax Document Type. | DocumentType |
| optionalParams | Data required for creating parameters in the query. | String |
| recordId | The id of the Salesforce record. | Id |

CancelTaxCalculator

Description Contains methods for canceling tax and updating back to Salesforce object.

Properties

The following are the cancel tax calculator properties and their information:

| Properties | Description | Data Type |
|---|---|---|
| headerQueryResult | Stores query wise result of SOQL defined under TaxCalculator->SalesforceObject->Header->Queries node. | Map<String,List<SObject>> |

Methods cancelTax

| | |
|---|---|
| Description | This method is responsible for Tax Calculation. |
| Returns | An instance of TransactionModel. |
| Param | An instance of CancelTaxCalculationInput. |

CancelTaxCalculator

| | |
|---|---|
| Description | Initializes an instance of CancelTaxCalculator class for the Salesforce object provided. |
| Returns | An instance of TaxCalculator class. |
| Parameters | |
| CallingPackage | name of the package which wants to calculate the tax. |
| Config | AvaTax Configuration details |

Models

CancelTaxCalculationInput

| | |
|---|---|
| Description | Cancel Tax details essential for Voiding the document. Tax calculation is affected by these details. |

Properties

The following are the cancel tax calculator input properties and their information:

| Properties | Description | Data Type |
|---|---|---|
| code | VoidReasonCode for Cancel Tax Calculation. | VoidReasonCode |
| companyCode | CompanyCode for Cancel Tax Calculation. | String |
| controller | Controller for Cancel Tax Calculation. | String |
| docType | DocType for Cancel Tax Calculation. | DocumentType |
| optionalParams | OptionalParams for Cancel Tax Calculation, One can specify if any extra parameters need to be sent to AvaTax Service. | Map<String, String> |
| recordId | RecordId for Cancel Tax Calculation. | Id |
| transactionCode | TransactionCode for Cancel Tax Calculation. | String |

ConfigurationBase

Description Abstract class for Configuration

Properties

The following are the configuration base properties and their information:

| Properties | Description | Data Type |
|---|---|---|
| accountId | Specify the accountId for validating in AvaTax. | Integer |
| appName | Specify the Application Name. | String |
| appVersion | Specify the Application Version. | String |
| companyCode | Specify the code of the company creating this transaction here. | String |
| defaultOriginAddress | Specify the instance of AddressValidationInfo for Origin Address. | AddressValidationInfo |
| environment | AvaTaxEnvironment for Tax Calculation. | AvaTaxEnvironment |
| isAddressValidationEnabled | Specify if the Address Validation is Enabled. | Boolean |
| isDateOverrideAllowed | Specify whether Transaction Date can be overridden. | Boolean |
| isTaxCalculationEnabled | Specify if the Tax Calculation is Enabled. | Boolean |
| isUPCEnabled | Specify whether the UPC Tax Code is allowed. | Boolean |
| licenseKey | Specify the licenseKey for validating in AvaTax. | String |
| password | Specify the Password for validating in AvaTax. | String |
| restClientName | Specify the Client Name. | String |
| returnAddressInUpperCase | Returns Address Validation result in Upper Case. | Boolean |
| saveTransactionToAvaTax | Specify whether to record the document to Avatax. | Boolean |
| Username | Specify the Username for validating in AvaTax. | String |

Enums

AvaTaxEnvironment

| Description | AvaTaxEnvironment for Tax Calculation |
|---|---|
| Return | NA |

Properties

The following are the configuration base properties and their information:

| Properties | Description |
|---|---|
| Sandbox | Development Environment. |
| Production | Production Environment. |

In some embodiments, the system may present a user interface to display information to a user and receive user input. The user input may be used to generate or modify a configuration file (e.g., in XML format) as described above. Examples of such a user interface are depicted below, which may be referred to as the "AvaTax Mapper Studio" or "Mapper Studio."

Avalara AvaTax Mapper Studio is a user interface to generate a modified config XML. You can manage or edit your integration points for AvaTax Mapper to work. The Mapper Studio has the following capabilities:

User can add new integration points (object) and new fields for address validation, tax calculation, and cancel tax calculation.

Remove the existing integration point.

Define hooks for functionality modification.

Validate query and fetch parameters from a query for defining its source value.

User interface works on a point and click method.

User can define the classes for hooks.

Steps to Open AvaTax Mapper Studio

Go to Setup->Installed Packages->Configure (AvaTax For Salesforce CPQ+)->Advanced Settings->Under Additional Settings, Click Launch Mapper Studio. The screen depicted in FIG. 7G may be viewed on a new tab.

Mapper Studio

After you open the Mapper Studio, you can view the AvaTax functionalities on the user interface.

On the Mapper Studio Avalara AvaTax provides integrations on the following functionalities:

Address Validation

Tax Calculation

Cancel Tax Calculation

Note: Address Validation tab is the default tab.

Integration Points

To add the integration points:

Avalara has enlisted the supported integration points in the Mapper Studio.

Default integrations are:

Order

Account

Contract

SBQQ_Quote_c

Click the plus icon  to add a new integration point (object).

SELECT NEW OBJECT NAME dialog box opens.

Select the object from the dropdown list, and click Add to add the object.

Under object, click the plus icon  to add a new field.

ADD NEW FIELD DETAILS dialog box opens.

Type the address in the test box and click Add.

Click the delete icon , and click Delete on the Delete dialog box to delete an object.

Click the delete icon , and click Delete on the Delete dialog box to delete the field.

How to Create Additional Integration Point (Objects) and Fields?

Steps to create additional integration point (objects) and fields:

Addressvalidation

Figure 7H:
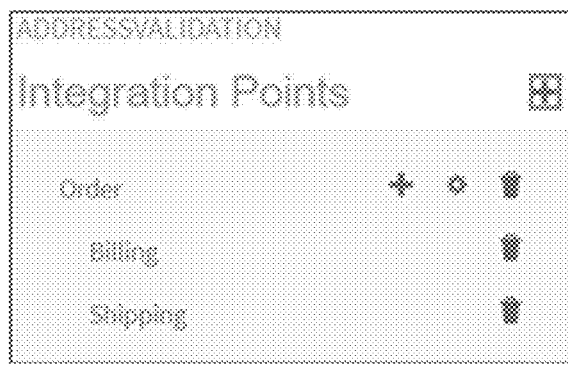
Figure 7I:
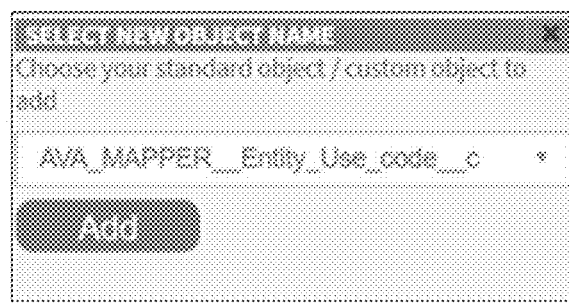
Figure 7J:
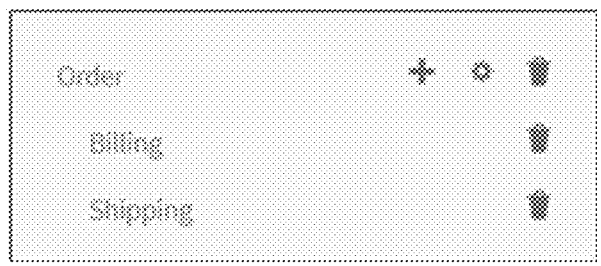

Click the plus icon  to add an additional integration point (object) as depicted in FIG. 7H. The SELECT NEW OBJECT NAME dialog box opens, and the user may select the object from the dropdown list, and click Add to add the object as depicted in FIG. 7I. Under object, click the plus icon  to add a new field, as depicted in FIG. 7J.

Figure 7K:
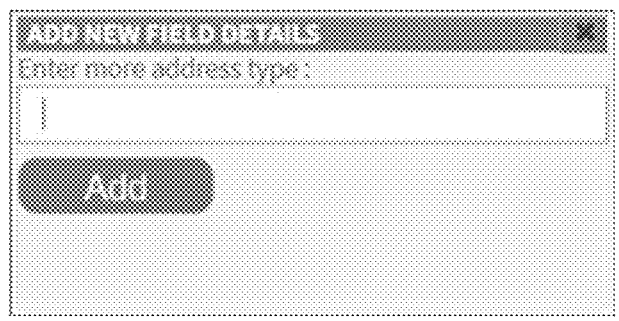

The ADD NEW FIELD DETAILS dialog box opens. Type the address in the test box and click Add as depicted in FIG. 7K.

Taxcalculation

Click the plus icon  to add an additional integration point (object) as depicted in FIG. 7H. The SELECT NEW OBJECT NAME dialog box opens. Select the object from the dropdown list, and click Add to add the object as depicted in FIG. 7I.

Click the plus icon  on Header and Line Queries of integration point (object) to add a new object at header and line level as depicted in FIG. 7J. The ADD NEW FIELD DETAILS dialog box opens. Select the object from the dropdown list, and click Add to add the object as depicted in FIG. 7K.

Canceltaxcalculation

Figure 7L:
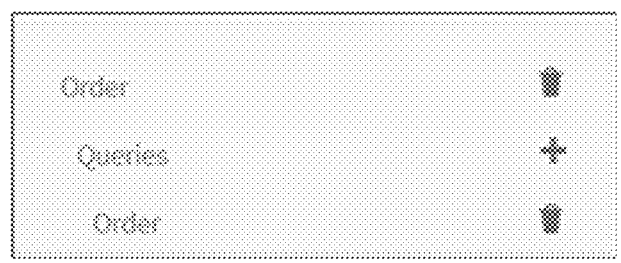
Figure 7M:
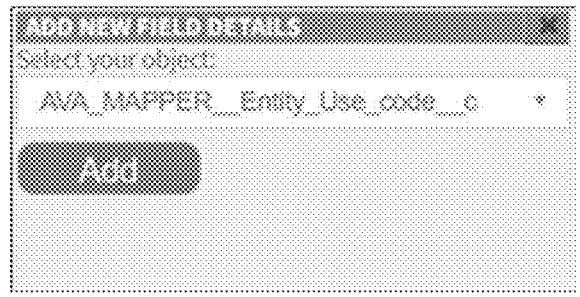

Click the plus icon  to add an additional integration point (object) as depicted in FIG. 7H. SELECT NEW OBJECT NAME dialog box opens. Select the object from the dropdown list, and click Add to add the object as depicted in FIG. 7I. Click the plus icon  on Queries of integration point (object) to add a new object at query level as depicted in FIG. 7L. The ADD NEW FIELD DETAILS dialog box opens. Select the object from the dropdown list, and click Add to add the object as depicted in FIG. 7M Hooks Hooks are the facility to customize the logic before or after tax calculation. Hooks varies from functional tabs.

The following types of hooks for tabs:

Hooks for Address Validation

Figure 7N:
Figure 7O:

Click the setting icon  to add new hook class in the integration point as depicted in FIG. 7N. Note: Avalara has defined the default sets of hook class. Click the edit icon  to type the definition of the hook as depicted in FIG. 7O and Click Save.

Hooks for Tax Calculation

Figure 7P:
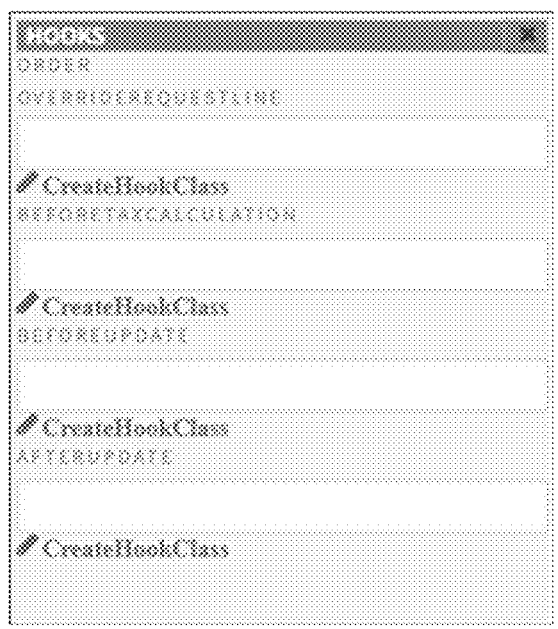
Figures 7Q, 7R, 7S:
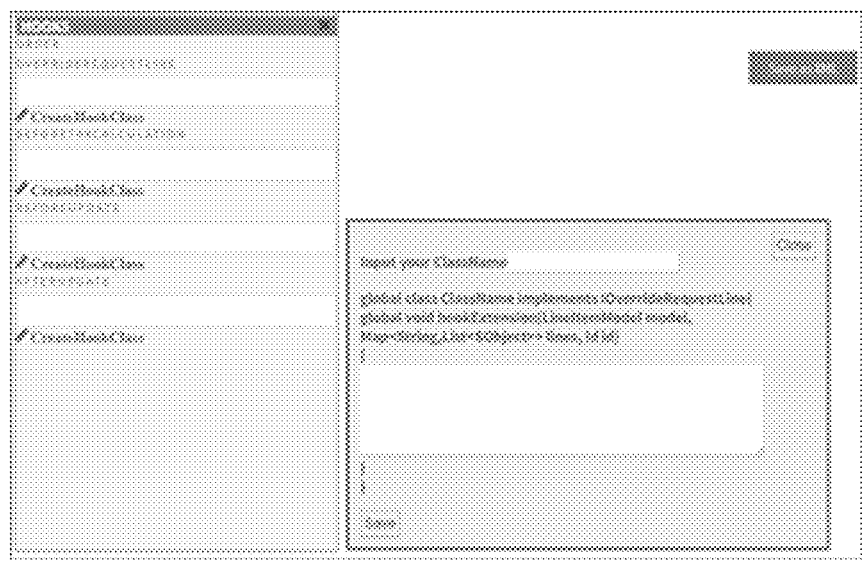

Click the setting icon  to add new hook class in the integration point as depicted in FIG. 7P. Note: Avalara has defined the default sets of hook class. Click the edit icon  to type the definition of the hook as depicted in FIG. 7Q and Click Save. Note: After every execution you must click Save as XML to save your changes, otherwise, it will temporarily delete the object/field, but resides in config XML.

How to Map Request and Response Mapping(s)?

Whenever you add a new integration point, or you want to make changes in the request and response mappings, and then click on the object/field under integration point.

Go to ADDRESSVALIDATION->Order->Billing.

Addressvalidation is a functionality, order is integration point on addressvalidation, and billing is the type of address.

Click Billing, to view the different sections on the right side which is shown below:

Query for Billing

It is placeholder where a user can enter/modify a Salesforce Object Query Language (SOQL), which gets validated with the help of salesforce. If a query is not valid, then its display an alert, or else, it fetched the parameter's data from the query, and displays the request and response mapping as depicted in FIG. 7R.

Query Parameters

This section gets list of all the parameters which are entered in query '{ }'. You can define its data, either it can be an Id, OptParams (optional param), or object as depicted in FIG. 7S.

AvaTax Request Mapping(s)

The mapping diagram in FIG. 7D illustrates an example of request mapping. In this example, billing fields are mapped with AvaTax, which means the data entered in the BillingStreet is mapped with line 1 of AvaTax, and it is passed to the request. It is the same for the rest of the fields. The arrows in FIG. 7D depict the mapping of the "Billing" fields on the left to the "AvaTax" fields on the right. The mapping of the fields in FIG. 7D is exemplary only. In alternate embodiments, the request fields may be mapped (and such mappings modified) in any suitable manner.

AvaTax Response Mapping(s)

FIG. 7E illustrates and example of an update mapping diagram for response mapping. In this example, AvaTax fields on the left are mapped with Billing fields on the right. In this example, a response received from AvaTax service call in line 1 is shown in BillingStreet. It is same for the remaining fields. As with the request mappings described above, the response fields may be mapped (and such mappings modified) in any suitable manner.

Software and System Architectures

Figure 8:
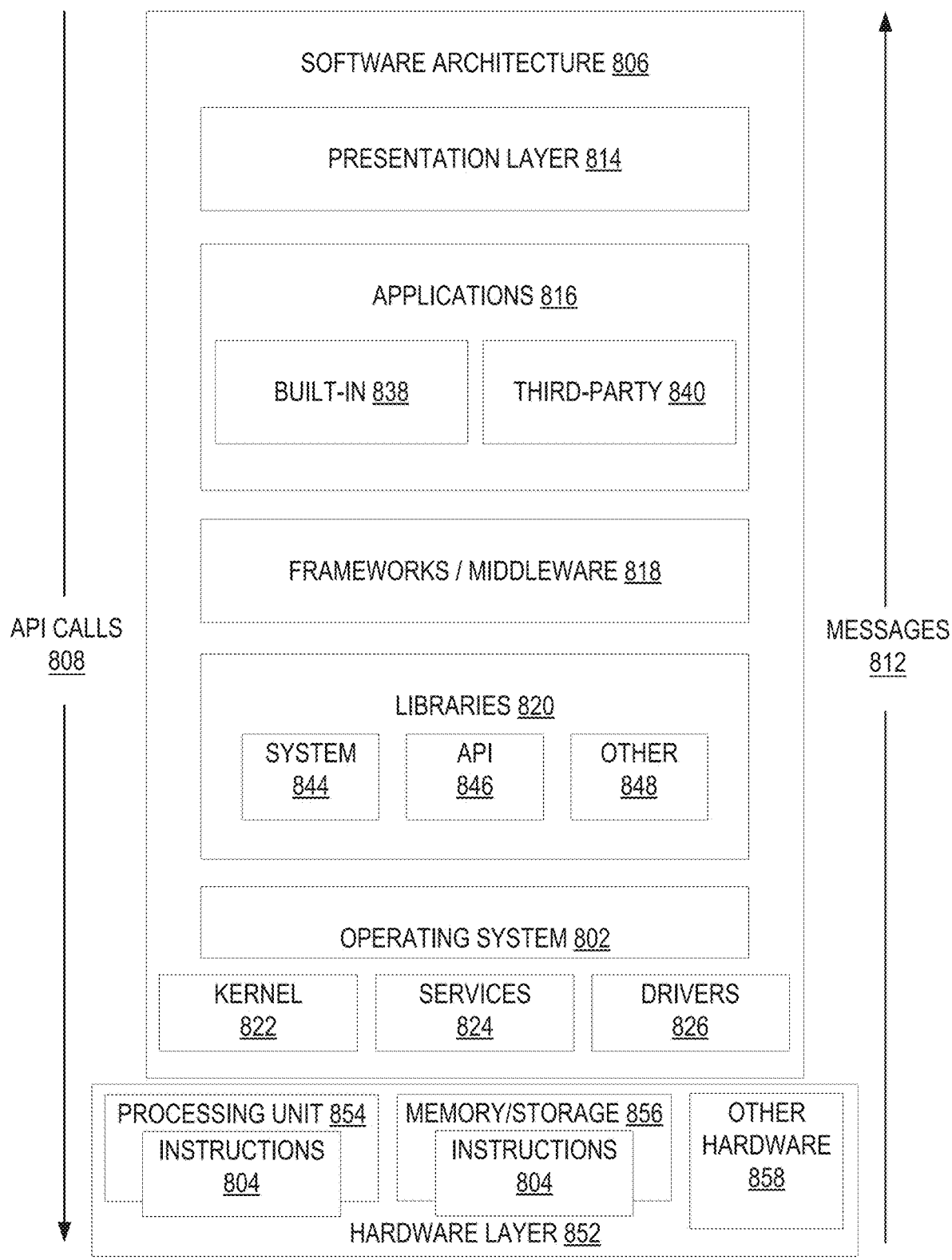
FIG. 8 is a block diagram illustrating an exemplary software architecture which may be used in conjunction with various hardware architectures herein described.

FIG. 8 is a block diagram illustrating an exemplary software architecture 806, which may be used in conjunction with various hardware architectures herein described. FIG. 8 is a non-limiting example of a software architecture and it will be appreciated that other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

As used herein, a "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled.

Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of exemplary methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
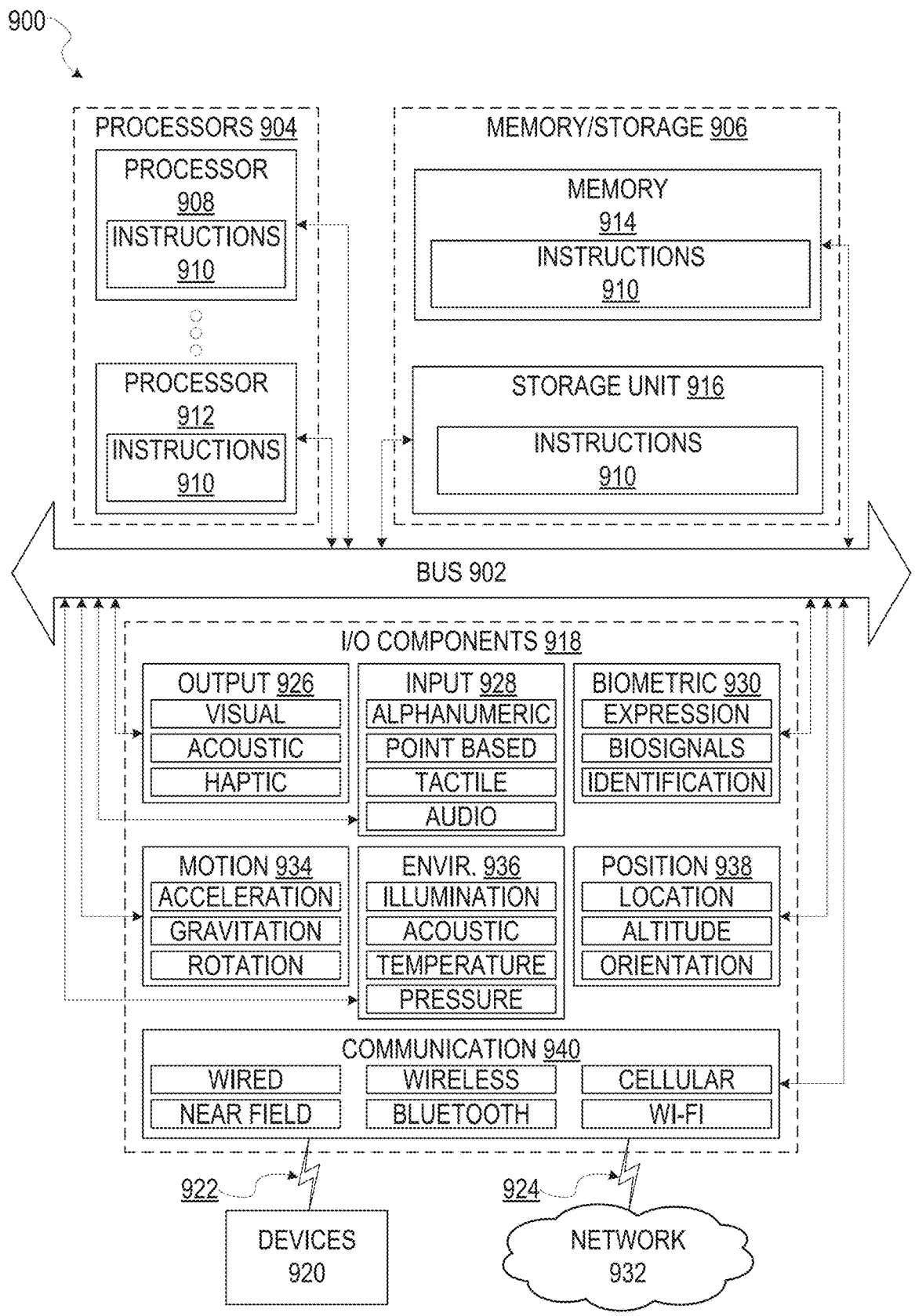
FIG. 9 is a block diagram illustrating components of an exemplary computer system according to some exemplary embodiments, which may read instructions from a machine-readable medium (e.g., a non-transitory computer-readable medium) and perform any one or more of the processes and methodologies discussed herein.

FIG. 9 is a block diagram illustrating components of a machine 900, according to some exemplary embodiments, able to read instructions from a machine-readable medium (e.g., a computer-readable storage medium) and perform any of the processes, methods, and/or functionality discussed herein. Specifically, FIG. 9 shows a diagrammatic representation of the machine 900 in the exemplary form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described.

In some embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may be or include, but is not limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" or "computer system" shall also be taken to include a collection of machines or computer systems that individually or jointly execute the instructions 910 to perform any of the methodologies discussed herein.

The machine 900 may include processors 904, memory memory/storage 906, and I/O components 918, which may be configured to communicate with each other, such as via bus 902. The memory/storage 906 may include a memory 914, such as a main memory, or other memory storage, and a storage unit 916, both accessible to the processors 904 such as via the bus 902. In this context, a "processor" may refer to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media. In this context, "machine-readable medium" refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various exemplary embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. Collectively, one or more of the I/O components 918 may be referred to as a "user interface" for receiving input, and displaying output, to a user. Additionally, the term "user interface" may be used in other contexts such as, for example, to describe a graphical user interface (e.g., a window displayed on a display screen to receive input from, and display output to, a user).

In further exemplary embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a processor; and
memory coupled to the processor and storing instructions that, when executed by the processor, cause the system to perform operations comprising:
presenting a user interface on a display screen of a client computing device;
receiving user input via the user interface, the user input including an identifier for a customized extension, the customized extension being used to indicate one or more additional processes, wherein each process includes at least one hook associated with a service;
storing the customized extension identifier in a configuration file stored in the memory;
receiving, from the client computing device over a network, a request to perform the service;
retrieving the configuration file stored in the memory;
identifying parameters associated with a response to the request;
identifying, based on the parameters associated with the response to the request, the customized extension;
identifying a customized process based on the customized extension;
determining whether the customized process is to be executed before performing the service or after performing the service;
performing the service using the customized extension;
performing the customized process based on the determination of whether the customized process is to be executed before performing the service or after performing the service;
generating the response to the request to perform the service, wherein the response is formatted based on parameters in an update mapping node; and
transmitting the response to the request to perform the service to the client computing device over the network.

2. The system of claim 1, wherein a plurality of nodes in the configuration file includes a feature node identifying an application program interface (API) to be used in conjunction with performing the service.

3. The system of claim 1, wherein an object component in the configuration file includes a query node that includes information for performing a query for an attribute of the object component.

4. The system of claim 3, wherein the information for performing the query includes object query language (OQL) for performing the query.

5. The system of claim 4, wherein the memory further stores instructions for causing the system to:
present a user interface on a display screen of the client computing device;
receiving user input via the user interface, the user input including OQL for performing the query; and
storing the OQL for performing the query within the query node in the configuration file.

6. The system of claim 3, wherein the object component further includes a parameter node that includes parameters for performing the query for the attribute.

7. The system of claim 6, wherein the memory further stores instructions for causing the system to:
present a user interface on a display screen of the client computing device;
receiving user input via the user interface, the user input including the parameters for performing the query; and
storing the parameters for performing the query within the parameter node in the configuration file.

8. The system of claim 3, wherein the object component further includes a mapping node that includes parameters associated with the request to perform the service.

9. The system of claim 1, wherein the configuration file comprises an identifier for an object and validation parameters for the object, and wherein performing the service includes validating the object based on the validation parameters.

10. The system of claim 9, wherein the object is an account, and wherein the validation parameters include an account identifier and address information associated with the account.

11. The system of claim 10, wherein the validation parameters include a mapping node that includes parameters associated with a request to validate the account.

12. The system of claim 10, wherein the validation parameters include an update mapping node that includes parameters associated with a response to the request to validate the account.

13. The system of claim 9, wherein the memory further stores instructions for causing the system to:
present a user interface on a display screen of the client computing device;
receiving user input via the user interface, the user input including the identifier for the object;
generating the validation parameters for the object based on the object identifier; and
storing the object identifier and the validation parameters for the object in the configuration file.

14. The system of claim 1, wherein the memory further stores instructions for causing the system to:
present the user interface on the display screen of the client computing device, in which the user interface includes an identifier for a hook associated with the service;
receive additional user input via the user interface, the additional user input including a definition for the customized extension; and
store the definition for the customized extension in the configuration file.

15. The system of claim 1, wherein performing the service includes:
executing a first process associated with the service; and
executing a second process associated with the customized extension.

16. A method comprising:
presenting a user interface on a display screen of a client computing device;
receiving user input via the user interface, the user input including an identifier for a customized extension of a computer service, the customized extension being used to indicate one or more additional processes, wherein each process includes at least one hook associated with a service;
storing the customized extension identifier in a configuration file stored in memory coupled to a computer system;
receiving, by the computer system from the client computing device over a network, a request to perform the service;
retrieving, by the computer system, the configuration file stored in memory coupled to the computer system;
identifying, by the computer system, parameters associated with a response to the request;
identifying, by the computer system and based on the parameters associated with the response to the request, the customized extension;
performing the service, by the computer system, using the customized extension;
generating, by the computer system, the response to the request to perform the service, wherein the response is formatted based on parameters in an update mapping node; and
transmitting, by the computer system, the response to the request to perform the service to the client computing device over the network.

17. A non-transitory computer-readable medium storing instructions that, when executed by a computer system, cause the computer system to perform operations comprising:
presenting a user interface on a display screen of a client computing device;
receiving user input via the user interface, the user input including an identifier for a customized extension of a computer service, the customized extension being used to indicate one or more additional processes, wherein each process includes at least one hook associated with a service;
storing the customized extension identifier in a configuration file stored in memory coupled to the computer system;
receiving, from the client computing device over a network, a request to perform the service;
retrieving the configuration file stored in memory coupled to the computer system;
identifying parameters associated with a response to the request;
identifying, based on the parameters associated with the response to the request, the customized extension;
performing the service using the customized extension;
generating the response to the request to perform the service, wherein the response is formatted based on parameters in an update mapping node; and
transmitting the response to the request to perform the service to the client computing device over the network.

* * * * *